United States Patent
Okada

(10) Patent No.: US 10,443,288 B2
(45) Date of Patent: Oct. 15, 2019

(54) ROLLER UNIT AND VEHICULAR OPENING-CLOSING BODY DRIVING DEVICE

(71) Applicant: Mitsuba Corporation, Gunma (JP)

(72) Inventor: Mitsuhiro Okada, Kiryu (JP)

(73) Assignee: Mitsuba Corporation, Gunma (JP)

( * ) Notice: Subject to any disclaimer, the term of this patent is extended or adjusted under 35 U.S.C. 154(b) by 149 days.

(21) Appl. No.: 15/547,918

(22) PCT Filed: Jan. 21, 2016

(86) PCT No.: PCT/JP2016/051669
§ 371 (c)(1),
(2) Date: Aug. 1, 2017

(87) PCT Pub. No.: WO2016/125590
PCT Pub. Date: Aug. 11, 2016

(65) Prior Publication Data
US 2018/0023332 A1   Jan. 25, 2018

(30) Foreign Application Priority Data

Feb. 4, 2015   (JP) .................................. 2015-020267

(51) Int. Cl.
*E05F 11/00* (2006.01)
*E05F 15/646* (2015.01)
(Continued)

(52) U.S. Cl.
CPC .............. *E05F 15/646* (2015.01); *B60J 5/06* (2013.01); *E05D 15/0665* (2013.01);
(Continued)

(58) Field of Classification Search
CPC ........ E05B 83/40; E05F 5/003; E05F 15/641; E05F 15/643; E05F 15/627; E05F 15/655;
(Continued)

(56) References Cited

U.S. PATENT DOCUMENTS 8,245,447 B2 *   8/2012   Oh ........................... E05C 17/60
                                                                296/155
9,238,399 B2 *   1/2016   Okuma ...................... B60J 5/06
(Continued)

FOREIGN PATENT DOCUMENTS

CN         1333142 A      1/2002
CN      101932464 A     12/2010
(Continued)

OTHER PUBLICATIONS

PCT Office, International Search Report issued in PCT Application No. PCT/JP2016/051669 dated Apr. 5, 2016, 2 pages.
(Continued)

*Primary Examiner* — Chi Q Nguyen
(74) *Attorney, Agent, or Firm* — Wood Herron & Evans LLP

(57) ABSTRACT

A roller unit includes a base bracket (2) that supports a slide door, a cable holder (11) formed integrally with the base bracket (2) and that holds cable ends (112a and 113a) of cables (112 and 113), and a cable guide (40) detachably installed at the cable holder (11) and that guides the cables (112 and 113), wherein the cable guide (40) is formed to separate the cables (112 and 113) from the base bracket (2), and a load applied to the cable guide (40) by tensile forces of the cables (112 and 113) is received by the cable holder (11) and the base bracket (2).

16 Claims, 22 Drawing Sheets

(51) Int. Cl.
*B60J 5/06* (2006.01)
*E05F 15/643* (2015.01)
*E05F 15/655* (2015.01)
*E05D 15/10* (2006.01)
*E05D 15/06* (2006.01)

(52) U.S. Cl.
CPC ........ *E05D 15/1047* (2013.01); *E05F 15/643* (2015.01); *E05F 15/655* (2015.01); *E05D 2015/1055* (2013.01); *E05Y 2900/531* (2013.01)

(58) Field of Classification Search
CPC ........ E05F 16/632; E05C 17/50; E05C 17/48; E05Y 2900/531; E05Y 2201/684; E05Y 2201/688; B60J 5/06; B60J 5/047; B60J 5/08; E05D 15/0621; E05D 15/063; E05D 15/0647
USPC ........... 49/360, 340, 349, 324; 292/216, 193
See application file for complete search history.

(56) References Cited

U.S. PATENT DOCUMENTS

| | | | | |
|---|---|---|---|---|
| 2004/0221510 | A1* | 11/2004 | Fukumoto | B60J 5/06 49/360 |
| 2006/0284447 | A1* | 12/2006 | Sato | E05F 15/646 296/155 |
| 2008/0072498 | A1* | 3/2008 | Rogers | E05F 15/646 49/360 |
| 2009/0241425 | A1 | 10/2009 | Robalo et al. | |
| 2010/0018125 | A1* | 1/2010 | Oh | E05C 17/60 49/449 |
| 2013/0154305 | A1* | 6/2013 | Thiele | B60J 5/06 296/155 |
| 2015/0033503 | A1* | 2/2015 | Yamada | B60J 5/06 16/91 |
| 2015/0152673 | A1* | 6/2015 | Lee | E05B 83/04 292/216 |
| 2015/0291013 | A1* | 10/2015 | Okuma | B60J 5/06 16/91 |
| 2016/0201374 | A1* | 7/2016 | Seto | E05D 15/1042 49/360 |
| 2016/0201375 | A1* | 7/2016 | Seto | B60J 5/06 49/360 |
| 2016/0298372 | A1* | 10/2016 | Seto | E05F 15/643 |

FOREIGN PATENT DOCUMENTS

| | | |
|---|---|---|
| CN | 102080484 A | 6/2011 |
| JP | 3907105 B2 | 4/2007 |
| JP | 2009235891 A | 10/2009 |
| JP | 2012188887 A | 10/2012 |
| JP | 2012193515 A | 10/2012 |
| JP | 5333123 B2 | 11/2013 |

OTHER PUBLICATIONS

Chinese Patent Office, Office Action issued in Chinese Patent Application No. 201680008235.2 dated Feb. 24, 2018, 7 pages.

* cited by examiner

ROLLER UNIT AND VEHICULAR OPENING-CLOSING BODY DRIVING DEVICE

TECHNICAL FIELD

The present invention relates to a roller unit and a vehicular opening-closing body driving device.

Priority is claimed on Japanese Patent Application No. 2015-020267, filed Feb. 4, 2015, the content of which is incorporated herein by reference.

BACKGROUND ART

In a related art, in a vehicle such as a station wagon, a minivan, or the like, a driving device that increases accessibility when an occupant boards and alights by driving a slide door, which is configured to open and close an open section for boarding and alighting installed at a side portion of a vehicle main body, with an electric motor is known.

The slide door is slidably supported at a guide rail extending in a forward/rearward direction of a vehicle main body via a roller unit. A curved section curved toward an inside of a passenger compartment is formed at a front side of the guide rail. Then, as the roller unit is guided to the curved section when the slide door is in a fully closed state, the slide door is drawn into the vehicle main body such that the slide door becomes flush with a side surface of the vehicle main body.

One end of each of two cables is connected to the roller unit. The other end of each of the two cables is connected to the driving device. The driving device is configured to individually pull the other ends of the two cables. When the cables are pulled, the roller unit is slid along the guide rail to perform an opening and closing operation of the slide door.

Here, when the roller unit is guided to the curved section of the guide rail, a wiring path length (a circumference) of the cables is increased. In order to suppress a variation in the wiring path length of the cables, it is preferable to make the positions of the each cables closer to the guide rail as much as possible.

Here, a technology in which a cable guide (a cable support body) is installed in order to make one end sides of two cables connected to a roller unit closer to a guide rail side is disclosed (for example, see Patent Document 1).

The cable guide is installed at the roller unit. Since a tensile force of each of the cables is applied to the cable guide, the cable guide should have stiffness to hold the cables. In Patent Document 1, an attachment tab configured to hold the cable guide is provided to increase holding stiffness of the cable guide with respect to the cable. The attachment tab is formed integrally with a main body section of the roller unit and is formed by processing a portion of the main body section. Accordingly, the holding stiffness of the cable guide with respect to the cable is secured while securing stiffness of the attachment tab.

CITATION LIST

Patent Document

[Patent Document 1]
Japanese Unexamined Patent Application, First Publication No. 2009-235891

SUMMARY OF INVENTION

Technical Problem

In a driving device of a related art, an attachment tab to increase holding stiffness of a cable guide with respect to a cable is installed, and further, processing of increasing stiffness of the attachment tab may be time-consuming and laborious.

In addition, since the time-consuming and laborious processing is performed, a size of a roller unit may be increased in addition to a deterioration of assemblability of the roller unit.

The present invention provides a roller unit and a vehicular opening-closing body driving device capable of increasing holding stiffness of a cable guide with respect to a cable with a simple structure and suppressing an increase in size while improving assemblability thereof.

Solution to Problem

According to a first aspect of the present invention, there is provided a roller unit that slidably supports a slide door along a guide rail installed at a vehicle main body and to which other end of an opening cable and other end of a closing cable are connected, wherein one end of the opening cable and one end of the closing cable are connected to a driving device configured to automatically open and close the slide door, the roller unit including: a bracket installed over the guide rail and the slide door and that supports the slide door at an end portion thereof which is on an opposite side to the vehicle main body; a roller installed at an end portion of the bracket on a slide door side and that rolls in the guide rail; a cable holder formed integrally with the bracket at the end portion of the bracket on the slide door side and that holds the other ends of the opening cable and the closing cable; and a cable guide detachably installed at the cable holder and that guides the opening cable and the closing cable, wherein the cable guide is formed to separate the opening cable and the closing cable from the bracket, and a load applied to the cable guide by tensile forces of the opening cable and the closing cable is received by the cable holder and the bracket.

According to the above-mentioned configuration, since only the cable guide is formed separately from the bracket or the cable holder, time and labor consumed for processing the parts can be saved. In addition, since it is only necessary for the cable guide to be attached to the cable holder, assemblability of the roller unit can be improved without performing time-consuming and laborious processing on the cable holder or the bracket being necessary.

Further, the cable guide is formed to separate the cables from the bracket, and the load applied by the tensile forces of the cables is received by the cable holder and the bracket. For this reason, it is not necessary to significantly increase stiffness of the cable guide itself to increase holding stiffness of the cable guide with respect to the cable. Accordingly, the holding stiffness of the cable guide with respect to the cable can be increased by a simple structure, and an increase in size of the roller unit can be suppressed.

According to a second aspect of the present invention, in the roller unit according to the first aspect of the present invention, the cable guide is disposed between the other end of the opening cable attached to the cable holder and the other end of the closing cable attached to the cable holder, and the opening cable and the closing cable are guided by the cable guide in an intersecting state with each other over the cable guide.

According to the above-mentioned configuration, the two cables can be bundled and separated from the bracket. For this reason, when compared to the case in which the two cables are individually separated from the bracket, a space in which the two cables are separated from the bracket can be saved.

According to a third aspect of the present invention, in the roller unit according to the first or second aspect of the present invention, the other ends of the opening cable and the closing cable are pivotably held by the cable holder.

According to the above-mentioned configuration, a degree of wiring freedom of the cables can be increased. For this reason, for example, once the other ends of the cables are attached to the cable holder, the two cables can also be intersected by twisting the bracket. For this reason, an assembly task of the roller unit can be facilitated.

According to a fourth aspect of the present invention, in the roller unit according to any one of the first to third aspects of the present invention, the cable guide includes a guide main body that guides the opening cable and the closing cable and that is extending in a wiring direction of the opening cable and the closing cable; and two leg sections respectively extending from both ends of the guide main body in a longitudinal direction toward the bracket.

As described above, since the two leg sections are formed at the cable guide, a load applied to the guide main body can be distributed using the two leg sections. For this reason, it is not necessary to unnecessarily increase the stiffness of the guide main body, and as a result, a size of the cable guide can be reduced.

In addition, shaking of the cable guide can be suppressed by the leg sections.

According to a fifth aspect of the present invention, in the roller unit according to the fourth aspect of the present invention, the leg sections of the cable guide include retaining sections disposed and fixed between the other ends of the opening cable and the closing cable and any one of the cable holder and the bracket.

According to the above-mentioned configuration, falling of the cable guide attached to the cable holder can be prevented by the retaining sections.

According to a sixth aspect of the present invention, in the roller unit according to the fourth or fifth aspect of the present invention, cable introducing sections that guide the opening cable and the closing cable to the guide main body are installed at both ends of the guide main body in the longitudinal direction.

According to the above-mentioned configuration, when the cables are wired, the cables can be easily guided to the guide main body. In addition, since displacement of the cables can be restricted by the cable introducing sections being installed, the cables can be prevented from rubbing against the cable holder when the roller unit is operated. For this reason, damage to the cables can also be prevented.

According to a seventh aspect of the present invention, in the roller unit according to a sixth aspect of the present invention, the cable introducing sections are formed at both ends of the guide main body in the longitudinal direction and formed at both ends of the guide main body in a short direction, and are extending in the longitudinal direction and inclining toward the bracket.

According to the above-mentioned configuration, the cable introducing section can be reliably interposed between the cable holder and the cables. For this reason, damage to the cables can be reliably prevented.

According to an eighth aspect of the present invention, in the roller unit according to any one of the first to seventh aspects of the present invention, the other ends of the opening cable and the closing cable respectively include columnar-shaped cable ends, the cable holder includes: cable end holding sections disposed at sides to which tensile forces of the other ends of the opening cable and the closing cable are applied; and cable hooks disposed at opposite sides of the cable end holding sections of the other ends of the opening cable and the closing cable, and outer circumferential sections of the cable ends are disposed and fixed between the cable end holding sections and the cable hooks.

According to the above-mentioned configuration, a task of attaching the other ends of the cables to the cable holder can be facilitated.

According to a ninth aspect of the present invention, in the roller unit according to the eighth aspect of the present invention, two sidewalls of the cable hooks are disposed in parallel to a direction perpendicular to the wiring direction of the opening cable and the closing cable, a distance between the two sidewalls is set to a distance which allows the opening cable and the closing cable to be inserted therethrough, and slits through which the opening cable and the closing cable are allowed to be inserted from an outside of the sidewalls in the plate thickness direction toward an inside of the sidewalls in a plate thickness direction are formed in the two sidewalls at sides opposite to the sides to which the tensile forces of the other ends of the opening cable and the closing cable are applied.

According to the above-mentioned configuration, the cable ends of the cables can be easily assembled to the cable hook. In addition, since the slits through which the cables are inserted are formed in the two sidewalls at sides opposite to the sides to which the tensile force of the cables are applied, it is possible to prevent the cable ends from deviating from the cable hooks due to the slits.

According to a tenth aspect of the present invention, in the roller unit according to the ninth aspect of the present invention, claw sections that engage with the cable hooks are formed at the cable guide.

According to the above-mentioned configuration, the cable guide can be reliably attached to the cable holder. In addition, falling of the cable guide from the cable holder can be reliably prevented.

According to an eleventh aspect of the present invention, in the roller unit according to the tenth aspect of the present invention, the claw sections are formed to cover the slits, and corner sections of slits that are at in inner surface sides of the sidewalls.

According to the above-mentioned configuration, it is possible to prevent damage to the cables due to the cables rubbing against the slits. In particular, as the corner sections (edges) of the slits in inner sides of the sidewalls at which the cables are likely to be rubbed and damaged are covered by the claw sections, damage to the cables can be reliably prevented.

According to a twelfth aspect of the present invention, in the roller unit according to the fourth aspect of the present invention, the leg sections of the cable guide are held at the cable holder together with the other ends of the opening cable and the closing cable, and slip preventing mechanisms that prevent falling of the other ends of the opening cable and the closing cable from the leg sections are installed at the leg sections.

According to the above-mentioned configuration, falling of the other ends of the cables from the cable holder can be prevented.

According to a thirteenth aspect of the present invention, in the roller unit according to the twelfth aspect of the present invention, the other ends of the opening cable and the closing cable respectively include columnar-shaped cable ends, insertion holes into which the cable ends are inserted are formed in the leg sections of the cable guide, and sides of the insertion holes in leg sections, which is opposite to the sides to which the tensile forces of the other ends of the opening cable and the closing cable are applied, function as the slip preventing mechanisms.

According to the above-mentioned configuration, falling of the other ends of the cables from the cable holder can be reliably prevented while facilitating an assembly task of the cables to the cable holder.

According to a fourteenth aspect of the present invention, in the roller unit according to any one of the first to thirteenth aspects of the present invention, the opening cable and the closing cable are wired by the cable guide in a manner so that the opening cable and the closing cable are offset toward a guide rail side with respect to the other ends of the opening cable and the closing cable.

According to the above-mentioned configuration, the cables can be made as close as possible to the guide rail. For this reason, a variation in wiring path length of the cables can be suppressed during sliding movement when the roller unit is slid along the guide rail.

According to a fifteenth aspect of the present invention, in the roller unit according to any one of the first to fourteenth aspects of the present invention, the roller has: a horizontal roller having a rotary shaft provided in a vertical direction; and a vertical roller having a rotary shaft provided in a horizontal direction, and the cable guide is disposed between the vertical roller and the guide rail.

According to the above-mentioned configuration, the cable guide can be disposed on a trajectory of the roller unit, i.e., a wiring path of the cables. For this reason, an application of an extra force to the cables can be prevented.

In addition, since the cables can effectively approach the guide rail, a variation in wiring path length of the cables can be reliably suppressed during sliding movement when the roller unit is slid along the guide rail.

According to a sixteenth aspect of the present invention, in the roller unit according to the fifteenth aspect of the present invention, the vertical roller is rotatably supported by a spindle formed integrally with the cable holder, the cable guide is detachably installed at the spindle, the cable guide is formed to surround the vertical roller and to be opened at one side in an attachment/detachment direction, and the opening cable and the closing cable are wired at an opposite side of the bracket of the cable guide.

According to the above-mentioned configuration, interference between the vertical roller and the cables can be reliably prevented, and damage to the cables can be prevented.

In addition, an intrusion of a foreign substance into the vertical roller can be suppressed. For this reason, generation of strange noises of the vertical roller due to the foreign substance can be suppressed.

According to a seventeenth aspect of the present invention, a vehicular opening-closing body driving device includes the roller unit according to any one of the first to sixteenth aspects of the present invention, and the driving device to which the one ends of the opening cable and the closing cable are connected.

According to the above-mentioned configuration, it is possible to provide a vehicular opening-closing body driving device capable of reliably suppressing a variation in wiring path length of cables during sliding movement when a roller unit is slidably moved along a guide rail.

In addition, it is possible to provide a vehicular opening-closing body driving device capable of increasing holding stiffness of a cable guide with respect to a cable with a simple structure, improving assemblability thereof, and suppressing an increase in a size thereof.

Advantageous Effects of Invention

According to the present invention, since only a cable guide is formed separately from a bracket or a cable holder, it is possible to save time and labor for processing each part. In addition, since the cable guide is simply attached to the cable holder, assemblability of a roller unit can be improved without requiring an application of time-consuming and laborious processing to the cable holder or the bracket.

Further, the cable guide is formed to separate cables from the bracket, and is configured to receive a load applied by a tensile force of each of the cables using the cable holder and the bracket. For this reason, it is not necessary to significantly increase a stiffness of the cable guide itself to increase holding stiffness of the cable guide with respect to the cable. Accordingly, the holding stiffness of the cable guide with respect to the cable can be increased with a simple structure and an increase in size of the roller unit can be suppressed.

DESCRIPTION OF EMBODIMENTS

Hereinafter, embodiments of the present invention will be described with reference to the accompanying drawings.

(Vehicle)

Figure 1:
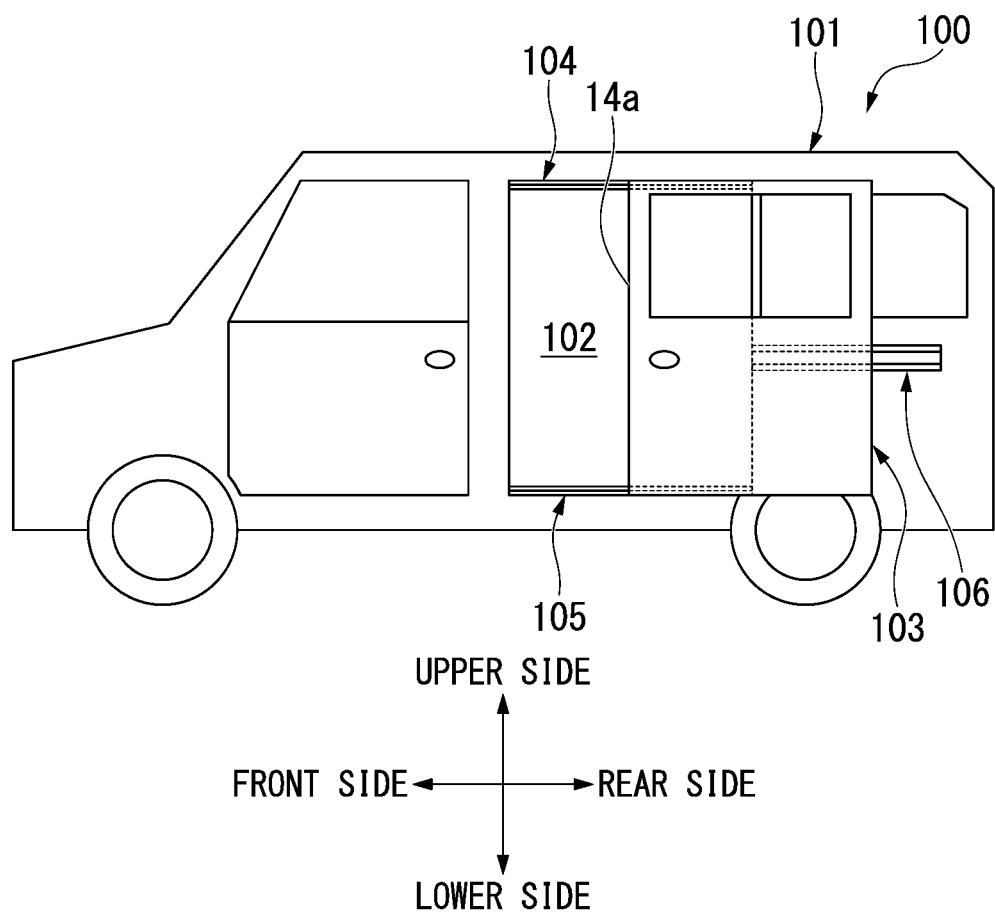
FIG. 1 is a side view of a vehicle according to an embodiment of the present invention.
Figure 2:
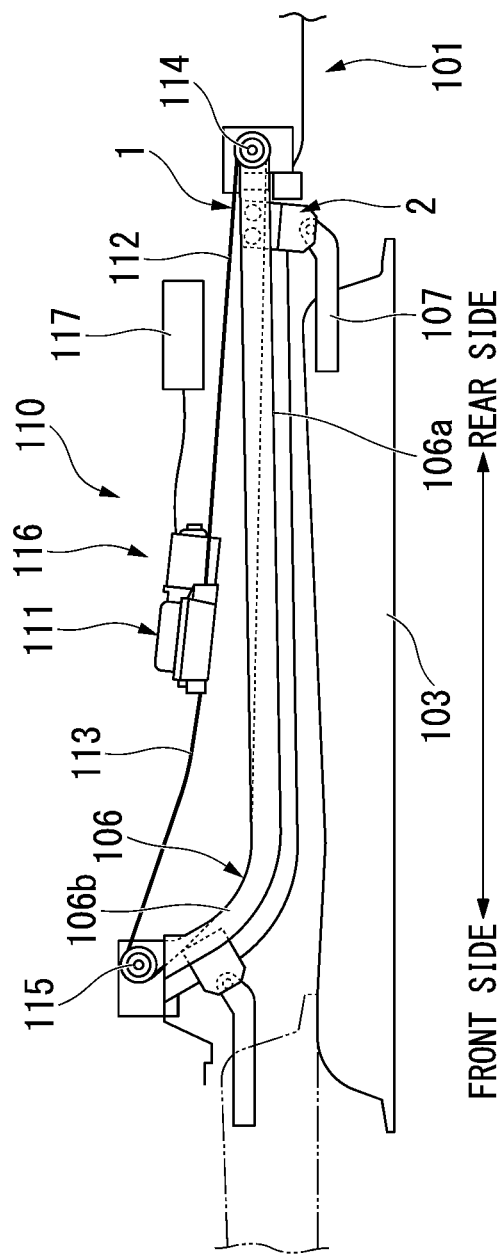
FIG. 2 is a plan view showing an attachment structure of a slide door to a vehicle main body according to the embodiment of the present invention.

FIG. 1 is a side view of a vehicle on which a slide door automatic opening-closing device according to the present invention is mounted, and FIG. 2 is a plan view showing an attachment structure of a slide door to a vehicle main body. Further, in the following description, a ground surface side of the vehicle is simply referred to as a lower side, a ceiling side of the vehicle is simply referred to as an upper side, a front side of the vehicle in an advance direction is simply referred to as a front side, a rear side in the advance direction is simply referred to as a rear side, and the like for convenience of description.

As shown in FIG. 1, a slide door 103 configured to open and close an open section 102 of a vehicle main body 101 is installed at a side portion of the vehicle main body 101 of a vehicle 100. The slide door 103 is respectively slidably supported by an upper rail 104 disposed above the open section 102, a lower rail 105 disposed below the open section 102, and a center rail 106 disposed at a substantial center of the open section 102 in an upward/downward direction and a rear side thereof.

As shown in FIG. 2, the center rail 106 is formed by integrally forming a linear section 106a having a linear shape extending in a forward/rearward direction and a curved section 106b curved toward an inside of a passenger compartment with respect to the linear section 106a. The center rail 106 is fixed to the vehicle main body 101 in a state in which the curved section 106b is directed forward.

In addition, while not shown, the upper rail 104 and the lower rail 105 are also constituted by linear sections extending in the forward/rearward direction and curved sections curved toward the inside of the passenger compartment with respect to the linear section.

A center arm 107 is installed at a rear end portion of the slide door 103 corresponding to the center rail 106. A tip of the center arm 107 is slidably supported by the center rail 106 via a roller unit 1.

In addition, while not shown, an upper arm is installed at an upper end portion in front of the slide door 103 and a lower arm is installed at a lower end portion thereof. Then, a tip of the upper arm is slidably supported by the upper rail 104 via a roller unit. Meanwhile, a tip of the lower arm is slidably supported by the lower rail 105 via a roller unit. The same structure as the roller unit 1 attached to the center rail 106 may be employed as the roller units attached to the upper rail 104 and the lower rail 105.

Here, a slide door automatic opening-closing device 110 configured to automatically open and close the slide door 103 is mounted on the vehicle 100. The slide door automatic opening-closing device 110 is a so-called cable type automatic opening-closing device. The slide door automatic opening-closing device 110 includes a driving unit 111 disposed at a substantial center of the center rail 106 in the forward/rearward direction and disposed inside the vehicle main body 101, an opening cable 112 configured to connect the driving unit 111 and a rear section of the roller unit 1, and a closing cable 113 configured to connect the driving unit 111 and a front section of the roller unit 1.

In addition, an opening-side pulley 114 is installed at a rear end of the center rail 106. Meanwhile, a closing-side pulley 115 is installed at a front end of the center rail 106. Then, one end of the opening cable 112 is connected to the driving unit 111 via the opening-side pulley 114 and the other end is wired to both the roller unit 1 and the driving unit 111 to be connected to the roller unit 1. Meanwhile, one end of the closing cable 113 is connected to the driving unit 111 via the closing-side pulley 115 and the other end is wired to both the roller unit 1 and the driving unit 111 to be connected to the roller unit 1.

The driving unit 111 includes an electric motor 116, a cable driving mechanism (not shown), and a control device 117 configured to drive and control the electric motor 116. Then, as the electric motor 116 controlled by the control device 117 rotates normally and reversely, the cable driving mechanism (not shown) is driven and the opening cable 112 or the closing cable 113 is pulled. Accordingly, the slide door 103 slides along the rails 104 to 16 by the roller unit 1. Then, an opening-closing operation of the slide door 103 is automatically performed.

Here, if the closing cable 113 is pulled when the slide door 103 is in an open state, the roller unit 1 is guided to the curved section 106b of the center rail 106 and the roller unit is guided to the upper rail 104 and the curved sections of the lower rail 105 (none of them are shown). Then, the slide door 103 is drawn into the passenger compartment from the outside of the vehicle main body 1 in an inclined angle, and is then made flush with the side surface of the vehicle main body 101 to be closed.

(First Embodiment)
(Roller Unit)

Figure 3:
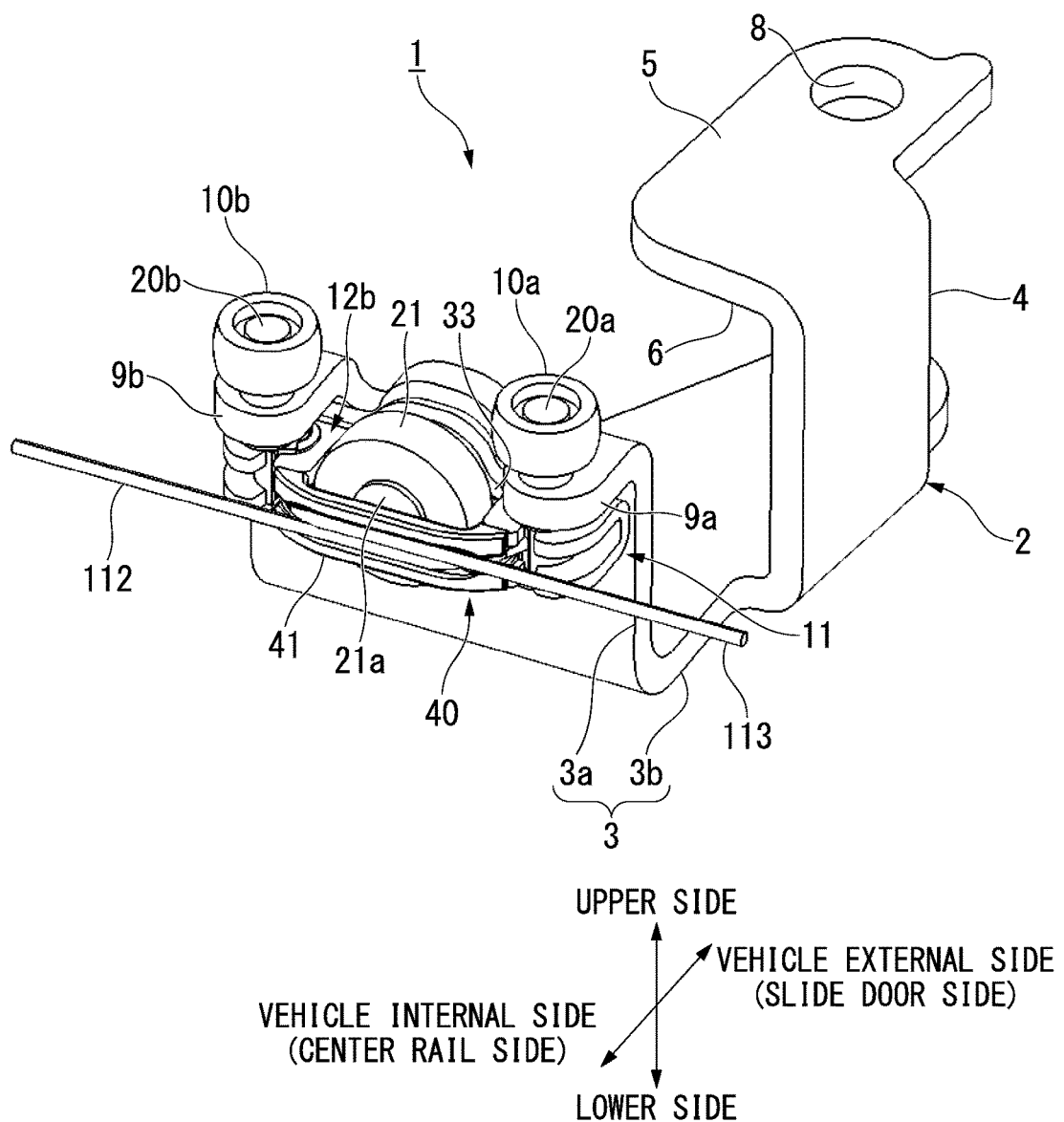
FIG. 3 is a perspective view of a roller unit according to a first embodiment of the present invention when seen from above.
Figure 4:
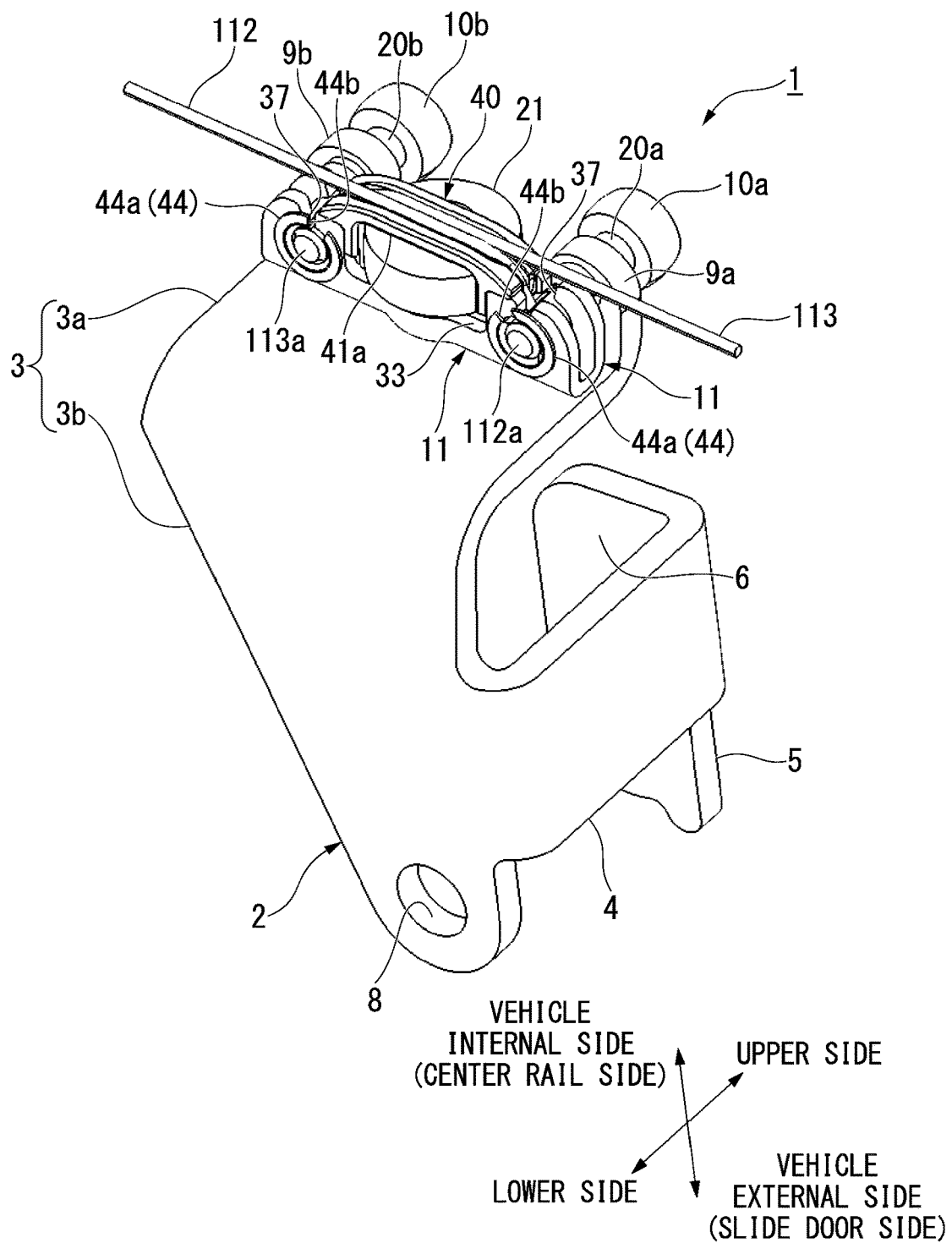
FIG. 4 is a perspective view of the roller unit according to the first embodiment of the present invention when seen from below.

FIG. 3 is a perspective view of the roller unit 1 when seen from above, and FIG. 4 is a perspective view of the roller unit 1 when seen from below.

As shown in FIGS. 3 and 4, one end of the roller unit 1 has a base bracket 2 attached to a tip of the center arm 107. The base bracket 2 is formed by a metal plate or the like being pressed and has a base main body 3 formed in a substantially L-shaped cross section. The base main body 3 is constituted by a longitudinal wall 3a extending in the upward/downward direction and a traverse wall 3b curved and extending from a lower end of the longitudinal wall 3a in a horizontal direction. Then, the longitudinal wall 3a is disposed in a state of being directed toward the center rail 106 side which is the vehicle main body 101 side.

A rising wall 4 is curved to extend upward from the traverse wall 3b of the base main body 3 at one side thereof, and a tongue section 5 is also curved to extend from an upper end of the rising wall 4 to be parallel to the traverse wall 3b and opposite thereto. A receiving section 6 having a substantially reversed "C" shaped cross section is formed by the traverse wall 3b, the rising wall 4, and the tongue section 5, and the center arm 107 extending from the slide door 103 is received therein.

In addition, insertion holes 8 through which a shaft (not shown) is inserted in the upward/downward direction are formed in the traverse wall 3b and the tongue section 5. Then, the base bracket 2 and the center arm 107 are connected to each other by the shaft (not shown). That is, the base bracket 2 is rotatably attached to the center arm 107 about a shaft 7.

Meanwhile, roller attachment seats 9a and 9b are curved to extend from an upper end of the longitudinal wall 3a at both ends in a widthwise direction toward the center rail 106 (a near side in FIG. 3), i.e., toward the vehicle main body 101 side (see FIG. 2). Horizontal rollers 10a and 10b are installed on the roller attachment seats 9a and 9b, respectively, to be received in the center rail 106. The horizontal rollers 10a and 10b are rotatably supported by spindles 20a and 20b protruding upward from the roller attachment seats 9a and 9b, respectively. In addition, a cable holder 11 disposed below the roller attachment seats 9a and 9b is installed at the longitudinal wall 3a of the base main body 3.

(Cable Holder)

Figure 5:
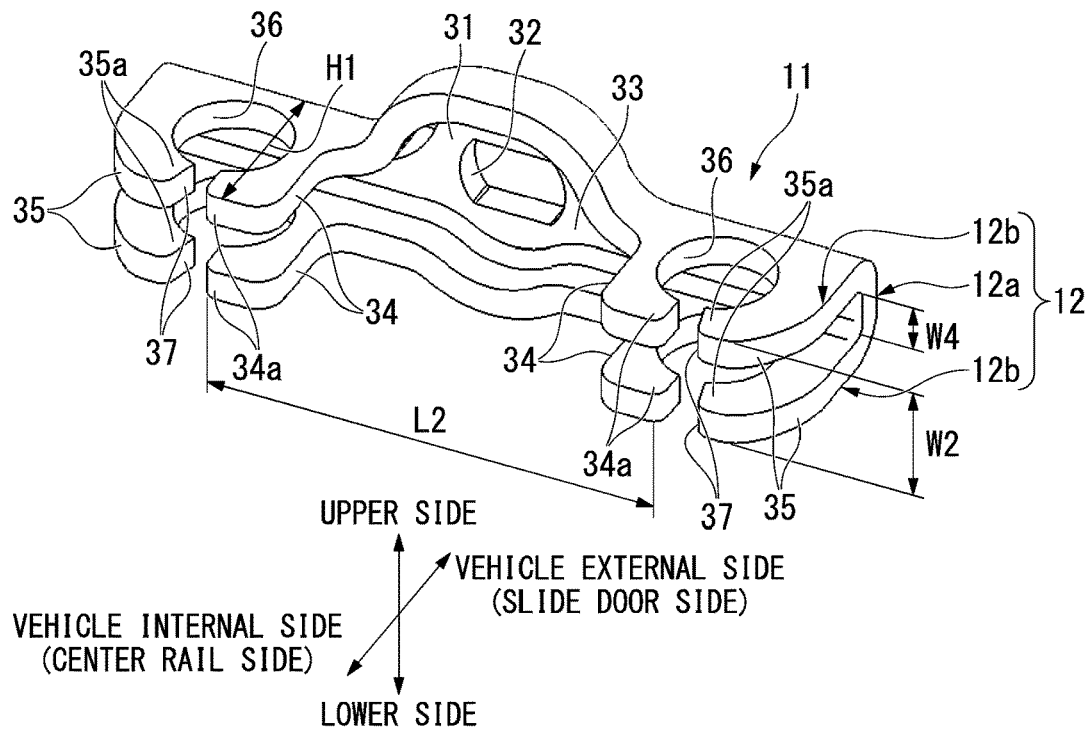
FIG. 5 is a perspective view of a cable holder according to the first embodiment of the present invention.

FIG. 5 is a perspective view of the cable holder 11.

As shown in FIGS. 3 to 5, the cable holder 11 is configured to fix a columnar cable end 112a installed at the other end of the opening cable 112 and a columnar cable end 113a installed at the other end of the closing cable 113 to the roller unit 1. The cable holder 11 is formed by a metal plate or the like being pressed and integrated with the base bracket 2 by welding or the like.

The cable holder 11 has a holder base 12 formed to be elongated in a widthwise direction of the base bracket 2. The holder base 12 is formed in a substantially reversed C-shaped cross section and constituted by a bottom wall 12a in contact with the base bracket 2 and two sidewalls 12b formed to be erecting in a short direction from both sides of the bottom wall 12a. Further, in the following description, a longitudinal direction of the bottom wall 12a of the cable holder 11 may be simply referred to as a longitudinal direction, and a short direction of the bottom wall 12a may be simply referred to as the short direction.

A central section of the bottom wall 12a in the longitudinal direction is an enlarged base section 31 that swells slightly in the upward/downward direction. A through-hole 32 having a substantially oval shape and passing in a thickness direction is formed in the enlarged base section 31.

In addition, the sidewalls 12b are largely notched at positions corresponding to the enlarged base section 31, and the notched places of the sidewalls 12b and the enlarged base section 31 are forming vertical roller disposition sections 33.

As shown in FIGS. 3 and 4 in detail, a vertical roller 21 received in the center rail 106 is installed at the vertical roller disposition section 33. The vertical roller 21 is rotatably supported by a spindle 21a. The spindle 21a is installed to protrude from the bottom wall 12a of the holder base 12 toward the center rail 106 side. That is, a base end of the spindle 21a is fixed to the base bracket 2 via a through-hole 32 formed in the bottom wall 12a of the holder base 12.

In this way, the spindles 20a and 20b of the horizontal rollers 10a and 10b and the spindle 21a of the vertical roller 21, which are installed at the roller unit 1, are installed to be substantially perpendicular to each other. That is, the horizontal rollers 10a and 10b roll in the center rail 106 while restricting movement of the roller unit 1 in the horizontal direction. Meanwhile, the vertical roller 21 receives a load applied to the roller unit 1 and rolls in the center rail 106 while transmitting the load to the center rail 106.

As shown in FIGS. 3 to 5, a height H1 of the sidewalls 12b of both end sides in the longitudinal direction is set to be substantially equal to a height of an end surface of the vertical roller 21 on the center rail 106 side. In addition, a width W4 (see FIG. 5) between the sidewalls 12b opposite each other in the short direction of the cable holder 11 is set to be a width through which the cables 112 and 113 are inserted. Further, each of the sidewalls 12b of both end sides in the longitudinal direction is formed in a substantially C shape when seen in a plan view in the upward/downward direction and is constituted by a cable end holding section 34 disposed at a central side in the longitudinal direction and cable hooks 35 disposed at both end sides in the longitudinal direction.

The cable end holding section 34 and the cable hook 35 have side surfaces opposite each other in the longitudinal direction and formed in arc shapes. Then, a tip portion 34a of the cable end holding section 34 and a tip portion 35a of the cable hook 35 are formed in shapes protruding in opposite directions in the longitudinal direction.

For this reason, the cable end holding sections 34 and the cable hooks 35 are cooperate with each other to form cable end insertion holes 36 into which the cable ends 112a and 113a are inserted at the most central portions of the sidewalls 12b. In addition, slits 37 are formed between tip portions of the cable end holding sections 34 and tip portions of the cable hooks 35. Then, a cable guide 40 is attached to the cable holder 11 configured as above.

(Cable Guide)

Figure 6:
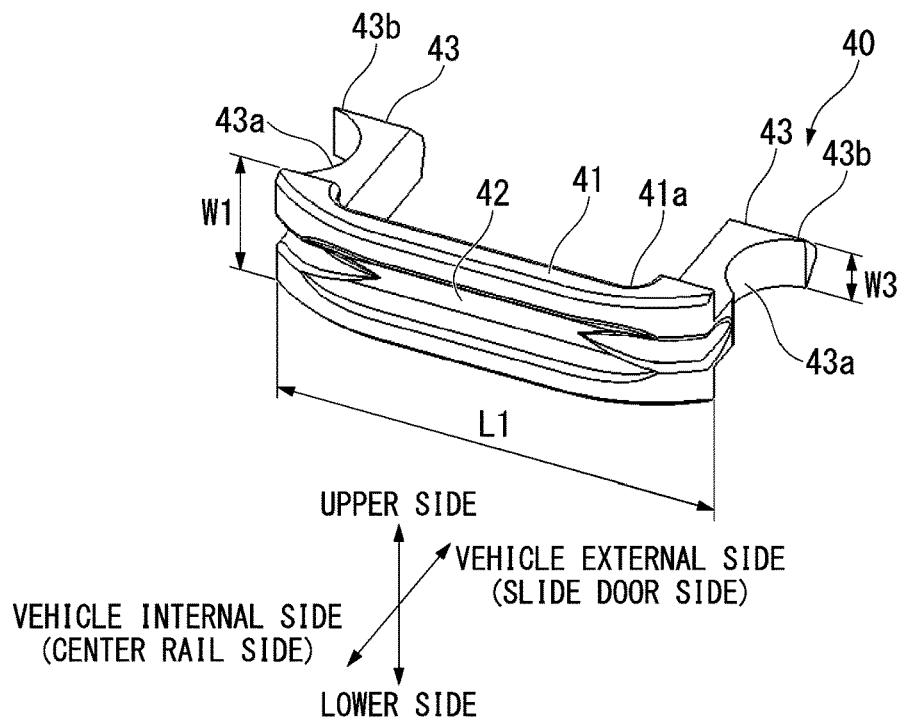
FIG. 6 is a perspective view of a cable guide according to the first embodiment of the present invention.
Figure 7:
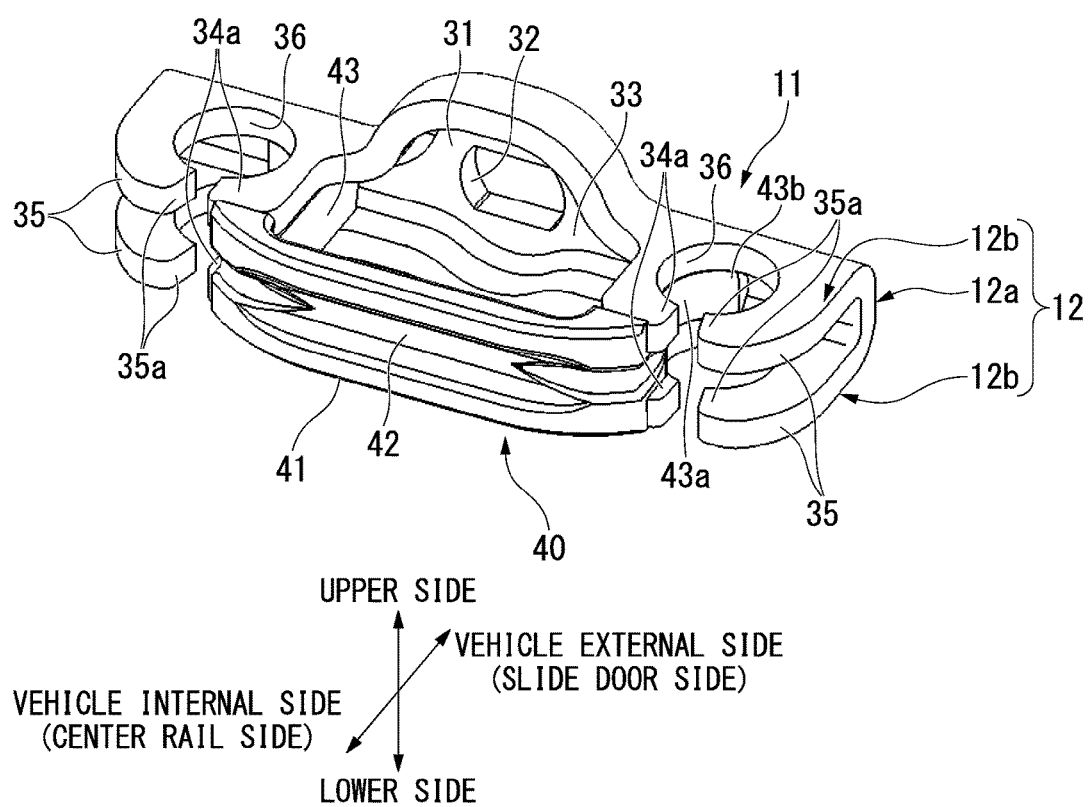
FIG. 7 is a perspective view showing a state in which the cable guide is attached to the cable holder according to the first embodiment of the present invention.

FIG. 6 is a perspective view of the cable guide 40. FIG. 7 is a perspective view showing a state in which the cable guide 40 is attached to the cable holder 11.

As shown in FIGS. 3, 4, 6, and 7, the cable guide 40 is configured to guide wiring directions of the cable ends 112a and 113a sides of the cables 112 and 113 fixed to the cable holder 11. The cable guide 40 is formed of a resin or a metal, and has a guide main body 41 having a substantially rectangular parallelepiped shape formed to be elongated in the longitudinal direction of the cable holder 11.

A width W1 of the guide main body 41 in the short direction (the upward/downward direction in FIG. 6) is set to be substantially equal to a width W2 of the cable holder 11 in the short direction (the upward/downward direction in FIG. 5). In addition, a length L1 of the guide main body 41 in the longitudinal direction is set to be substantially equal to a length L2 between the tip portions 34a of the cable end holding sections 34 disposed at both sides of the cable holder 11 in the longitudinal direction.

Then, as shown in FIGS. 3 and 4 in detail, the guide main body 41 is placed between end portions of the center rail 106 side of the two cable end holding sections 34 disposed at both sides thereof in the longitudinal direction. That is, the guide main body 41 is in a state in which the vertical roller 21 is covered from the center rail 106 side.

A concave section 41a configured to avoid interference with the vertical roller 21 is formed in a surface of the guide main body 41 on the vertical roller 21 side. Meanwhile, a guide groove 42 is formed at the center rail 106 side of the guide main body 41 in the longitudinal direction. The guide groove 42 has a bottom surface that is formed as a smooth surface that is continuous in the longitudinal direction and comes into communication with a gap between the sidewalls 12*b* opposite each other in the short direction of the cable holder 11. The cables 112 and 113 are wired in the guide groove 42. For this reason, the cables 112 and 113 can be wired without applying a load, and the cables 112 and 113 can be suppressed from being cut during wiring.

Leg sections 43 protruding toward the bottom wall 12*a* side of the cable holder 11 are formed integrally with both ends of the guide main body 41 in the longitudinal direction. A width W3 of the leg sections 43 in the thickness direction (the upward/downward direction in FIG. 6) is set to be slightly smaller than or substantially equal the width W4 between the sidewalls 12*b* of the cable holder 11. Then, the leg sections 43 are inserted between the sidewalls 12*b* of the cable holder 11, and tips thereof abut the bottom wall 12*a* of the cable holder 11. Arc surfaces 43*a* are formed at the leg sections 43 to correspond to the cable end insertion holes 36 of the cable holder 11 at side surfaces of both end sides thereof in the longitudinal direction. The arc surfaces 43*a* configure portions of the cable end insertion holes 36.

As shown in FIG. 4, collars 44 are inserted into the cable end insertion holes 36 in a state in which the cable guide 40 is attached to the cable holder 11. Further, the cable ends 112*a* and 113*a* are inserted via the collars 44. In other words, the cable ends 112*a* and 113*a* are disposed and fixed between the cable end holding sections 34 and the cable hooks 35 via the collars 44.

The collar 44 is formed of a resin in a cylindrical shape. The collar 44 has a flange section 44*a* at one end in an axial direction thereof. In addition, a claw section (not shown) is formed at the other end of the collar 44 in the axial direction. Then, the collar 44 is inserted into the cable end insertion hole 36 from the claw section side of the collar 44. Then, the collar 44 is elastically deformed, and the claw section is engaged with a circumferential edge section of the cable end insertion hole 36 when the collar passes through the cable end insertion hole 36. That is, the collar 44 is snap-fitted and fixed to the cable end holding section 34 and the cable hook 35 by the flange section 44*a* and the claw section (not shown).

In addition, a slit 44*b* is formed in a circumferential wall of the collar 44 in the axial direction. Meanwhile, the slit 37 is formed between the cable end holding section 34 and the cable hook 35 of the cable holder 11. For this reason, when the cable ends 112*a* and 113*a* are inserted into the cable end insertion holes 36 via the collars 44, the cables 112 and 113 do not abut and interfere with the sidewalls 12*b* or the collars 44 of the cable holder 11.

Here, when the cable ends 112*a* and 113*a* are inserted into the cable end insertion holes 36, initially, the predetermined cable ends 112*a* and 113*a* are inserted into the cable end insertion holes 36 disposed at positions opposite to a drawing-out direction of the corresponding cables 112 and 113.

That is, in FIG. 4, the opening cable 112 is pulled leftwardly out, and the cable end 112*a* of the opening cable 112 is inserted into a right side cable end insertion hole 36 of the two cable end insertion holes 36.

Meanwhile, in FIG. 4, the closing cable 113 is pulled rightwardly out, and the cable end 113*a* of the closing cable 113 is inserted into a left side cable end insertion hole 36 of the two cable end insertion holes 36.

In a state in which the cable ends 112*a* and 113*a* are inserted into the cable end insertion holes 36, the cables 112 and 113*a* are disposed at a center of the cable holder 11 in the short direction, i.e., at a gap between the sidewalls 12*b* opposite each other in the short direction of the cable holder 11. Then, the cables 112 and 113 pulled out of the cable ends 112*a* and 113*a* are received in the guide groove 42 in a shape intersecting the cable guide 40.

Here, since the arc surfaces 43*a* are formed at the leg sections 43 of the cable guide 40, when the cable ends 112*a* and 113*a* are inserted into the cable end insertion holes 36 in a state in which the cable guide 40 is attached to the cable holder 11, tips of the leg sections 43 are disposed and fixed between the cable ends 112*a* and 113*a* and the bottom wall 12*a* of the cable holder 11. Accordingly, the cable guide 40 is prevented from falling out of the cable holder 11. That is, the tips of the leg sections 43 of the cable guide 40 function as retaining sections 43*b* configured to prevent the falling of the cable guide 40 from the cable holder 11.

(Assembly Method of Roller Unit and Action of Roller Unit)

Next, an assembly method of the roller unit 1 and an action of the roller unit 1 will be described.

First, the horizontal rollers 10*a* and 10*b* and the vertical roller 21 are pre-assembled to the base bracket 2. After that, the cable guide 40 is attached to the cable holder 11 and the collars 44 are inserted into the cable end insertion holes 36. Here, positions of the slits 44*b* formed in the collars 44 are matched to positions of the slits 37 of the cable holder 11, and the collars 44 are inserted into the cable end insertion holes 36.

Next, the cable ends 112*a* and 113*a* of the cables 112 and 113 are inserted into the cable end insertion holes 36.

Here, first, the base bracket 2 is upside down from a normal orientation. Then, the cable ends 112*a* and 113*a* are inserted into the cable end insertion hole 36 disposed in the drawing-out direction of the corresponding cables 112 and 113. After that, as the base bracket 2 is twisted to the normal orientation, the cables 112 and 113 intersect with each other on the cable guide 40 and are received in the guide groove 42 of the cable guide 40.

That is, in FIG. 4, the opening cable 112 is pulled leftwardly out, and the cable end 112*a* of the opening cable 112 is inserted into the right side cable end insertion hole 36 of the two cable end insertion holes 36.

Meanwhile, in FIG. 4, the closing cable 113 is pulled rightwardly out, and the cable end 113*a* of the closing cable 113 is inserted into the left side cable end insertion hole 36 of the two cable end insertion holes 36. Then, the cables 112 and 113 pulled out of the cable ends 112*a* and 113*a* are received in the guide groove 42 in shapes intersecting each other on the cable guide 40.

Here, in a state in which the cable ends 112*a* and 113*a* are inserted into the cable end insertion holes 36, the cable ends 112*a* and 113*a* are pivotable with respect to the cable end insertion holes 36. For this reason, when the base bracket 2 is turned to the normal orientation, the cable ends 112*a* and 113*a* are pivoted and the cables 112 and 113 can easily intersect each other without twisting the cables 112 and 113.

In addition, lengths of the cables 112 and 113 are defined as dimensions in which the base bracket 2 is in the normal orientation (in a state in which the cables 112 and 113 intersect with each other on the cable guide 40). For this reason, when the cable ends 112*a* and 113*a* are inserted into the cable end insertion holes 36 (when an orientation of the base bracket 2 is upside down), the cables 112 and 113 are in a relaxed state. For this reason, in a state in which no tensile force is applied to the cables 112 and 1113, the cable ends 112*a* and 113*a* can be inserted into the cable end insertion holes 36. Accordingly, an insertion task of the cable ends 112a and 113a can be easily performed.

After the cable ends 112a and 113a are attached to the cable holder 11 and an orientation of the base bracket 2 is the normal orientation, the roller unit 1 is attached to the center rail 106. Accordingly, attachment of the roller unit 1 is terminated.

Here, the cables 112 and 113 at the place at which the cables are received in the guide groove 42 of the cable guide 40 deviate in a direction receding from the bottom wall 12a (the base bracket 2) of the cable holder 11 farther than the position at which the cable ends 112a and 113a are attached. In other words, the parts of the cables 112 and 113 that are received in the guide groove 42 of the cable guide 40 are wired in a manner so that the above-mentioned parts of the cables 112 and 113 are offset toward the center rail 106 side with respect to the position at which the cable ends 112a and 113a are attached.

For this reason, when tensile forces are applied to the cables 112 and 113, a pressing force directed toward the bottom wall 12a side (the base bracket 2) of the cable holder 11 is applied to the guide main body 41. The pressing force is distributed to the leg sections 43, and then, the cable holder 11 and the base bracket 2 receive the pressing force.

In addition, the parts of the cables 112 and 113 that are received in the guide groove 42 of the cable guide 40 are wired in a manner so that the above-mentioned parts of the cables 112 and 113 are offset toward the center rail 106 side with respect to the position at which the cable ends 112a and 113a are attached. For this reason, it is possible to make the cables 112 and 113 as close as possible to the center rail 106.

In addition, since the cables 112 and 113 intersect on the cable guide 40, the cable ends 112a and 113a press the cable end holding sections 34 when tensile forces are applied to the cables 112 and 113. That is, since the cable end holding section 34 has a side surface opposite to the cable hook 35 in the longitudinal direction and formed in an arc shape, it receives loads of the cable ends 112a and 113a, and holds the cable ends 112a and 113a. Meanwhile, the cable hooks 35 function to prevent the falling of the cable ends 112a and 113a from the cable end holding sections 34.

In the above-mentioned first embodiment, the cable guide 40 is detachably installed at the cable holder 11. For this reason, since only the cable guide 40 can be formed separately from the base bracket 2 or the cable holder 11, time and labor consumed for processing the parts can be saved. In addition, since it is only necessary for the cable guide 40 to be attached to the cable holder 11, it is possible to eliminate the necessity of time-consuming performing processing on the cable holder 11 or the base bracket 2.

Further, the cable guide 40 is configured such that positions of the cables 112 and 113 deviate in a direction receding from the bottom wall 12a (the base bracket 2) of the cable holder 11 farther than the position at which the cable ends 112a and 113a are attached. That is, the cable guide 40 offsets the positions of the cables 112 and 113 from the position, at which the cable ends 112a and 113a are attached, toward the center rail 106 side. For this reason, even when the center rail 106 is constituted by the linear section 106a and the curved section 106b, a variation in the wiring path length of the cables 112 and 113 due to a slide position of the roller unit 1 can be suppressed.

In addition, since the cable guide 40 separates (pushes up) the cables 112 and 113 from the cable holder 11 and the base bracket 2, when tensile forces are applied to the cables 112 and 113, the cable guide 40 is pressed by the tensile forces.

Then, the pressing force applied to the cable guide 40 is received by the cable holder 11 and the base bracket 2.

That is, the load applied to the cable guide 40 is received by the cable holder 11 and the base bracket 2. For this reason, it is not necessary to significantly increase stiffness of the cable guide 40 itself to increase holding stiffness of the cable guide 40 with respect to the cables 112 and 113. Accordingly, the holding stiffness of the cable guide 40 with respect to the cables 112 and 113 can be increased with a simple structure, and an increase in size of the roller unit 1 can be suppressed.

Further, the cable guide 40 is constituted by the guide main body 41 having a substantially rectangular parallelepiped shape and the leg sections 43 formed to protrude from both ends of the guide main body 41 in the longitudinal direction. For this reason, a load applied to the guide main body 41 by the tensile forces of the cables 112 and 113 can be distributed by the leg sections 43. Accordingly, it is not necessary to significantly increase stiffness of the guide main body 41, and the cable guide 40 can be reduced in size as a result.

In addition, shaking of the cable guide 40 can be suppressed by the leg sections 43.

Further, the arc surfaces 43a that constitute portions of the cable end insertion holes 36 are formed at the leg sections 43 of the cable guide 40, and the tips of the leg sections 43 are disposed and fixed between the cable ends 112a and 113a and the bottom wall 12a of the cable holder 11. Accordingly, the tips of the leg sections 43 of the cable guide 40 function as the retaining sections 43b configured to prevent the falling of the cable guide 40 from the cable holder 11. For this reason, the falling of the cable guide 40 attached to the cable holder 11 can be prevented.

Then, the cables 112 and 113 are disposed to intersect on the cable guide 40. For this reason, the two cables 112 and 113 can be collectively separated from the bottom wall 12a (the base bracket 2) of the cable holder 11 using the one cable guide 40. Accordingly, space can be saved in comparison with the case in which the two cables 112 and 113 are individually separated from the base bracket 2.

In addition, the cable ends 112a and 113a each having a columnar shape are installed at the other ends of the cables 112 and 113, and the cable holder 11 and the cables 112 and 113 are connected via the cable ends 112a and 113a. Accordingly, the cable ends 112a and 113a are pivotable about axes of the cable ends 112a and 113a with respect to the cable holder 11.

For this reason, when the roller unit 1 is assembled, once the base bracket 2 is set upside down from the normal orientation, the base bracket 2 can be turned to the normal orientation after the cable ends 112a and 113a are assembled to the base bracket 2. In this way, even when the base bracket 2 is turned, the cables 112 and 113 can be prevented from being twisted. Accordingly, when the cable ends 112a and 113a are assembled to the cable holder 11, the cables 112 and 113 can be deflected and an assembly task of the roller unit 1 can be facilitated.

Further, the sidewalls 12b of the cable holder 11 are constituted by the cable end holding sections 34 and the cable hooks 35. Then, the cable end holding sections 34 receive the loads of the cable ends 112a and 113a and hold the cable ends 112a and 113a. Meanwhile, the cable hooks 35, disposed at the position opposite the sides to which loads of the cable ends 112a and 113a are applied, function to prevent the falling of the cable ends 112a and 113a from the cable end holding sections 34.

In this way, as the cable end holding sections 34 and the cable hooks 35 are formed at the sidewalls 12b for respective roles, a task of attaching the cable ends 112a and 113a to the cable holder 11 can be facilitated.

In addition, the cable guide 40 is formed such that the guide main body 41 of the cable guide 40 covers the vertical roller 21 from the center rail 106 side. That is, the guide main body 41 of the cable guide 40 is disposed between the vertical roller 21 and the center rail 106.

For this reason, the cable guide 40 can be disposed on a trajectory of the roller unit 1, i.e., wiring paths of the cables 112 and 113. As a result, it is possible to prevent an extra force from being applied to the cables 112 and 113. In addition, since the cables 112 and 113 can effectively approach the center rail 106, a variation in the wiring path lengths of the cables 112 and 113 due to a slide position of the roller unit 1 can be securely suppressed.

(Second Embodiment)
(Roller Unit)

Next, a second embodiment of the present invention will be described with reference to FIGS. 8 to 12. Further, the same components as the first embodiment are designated and described by the same reference numerals (the same as below in the following embodiments).

Figure 8:
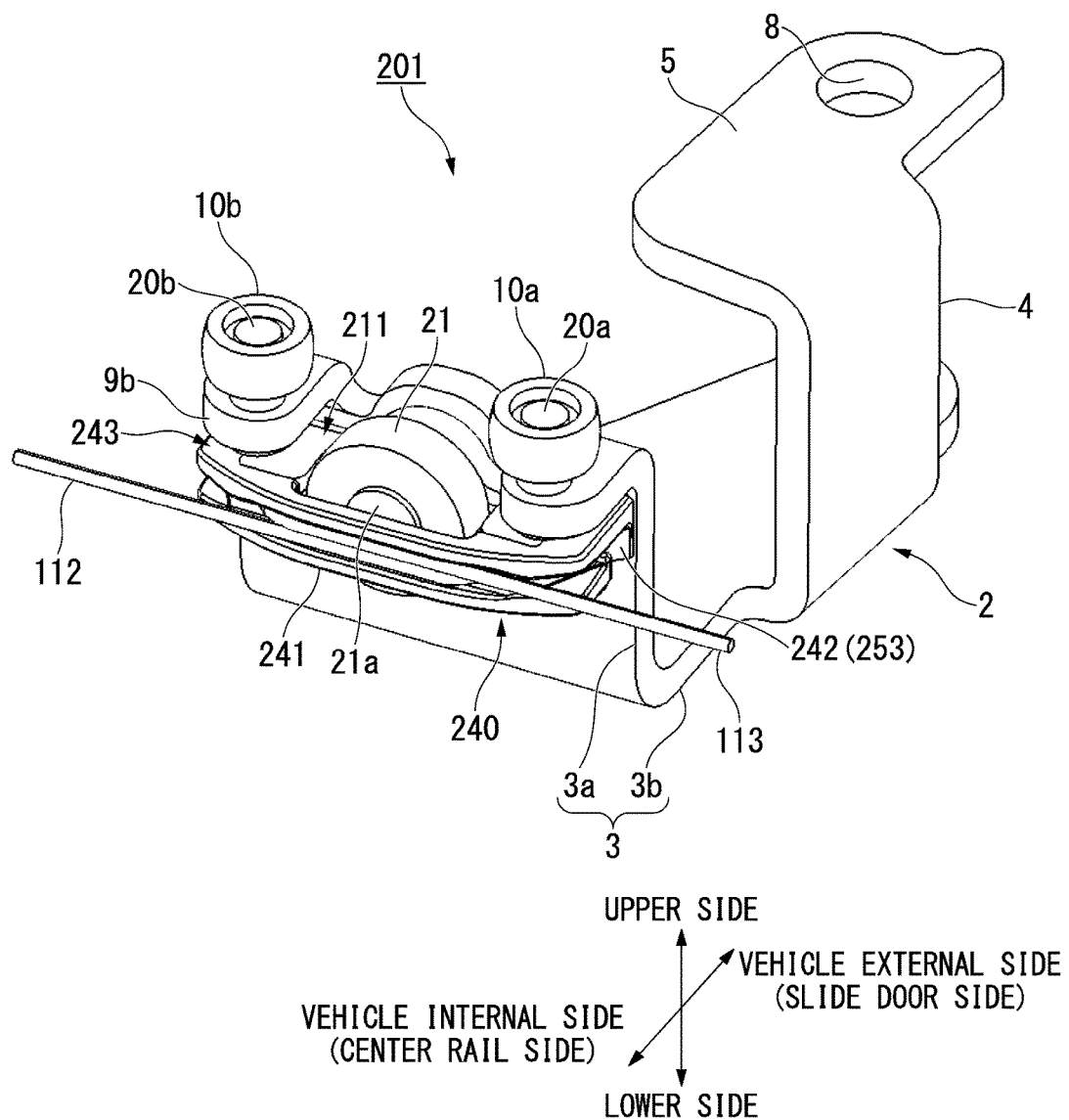
FIG. 8 is a perspective view of a roller unit according to a second embodiment of the present invention when seen from above.
Figure 9:
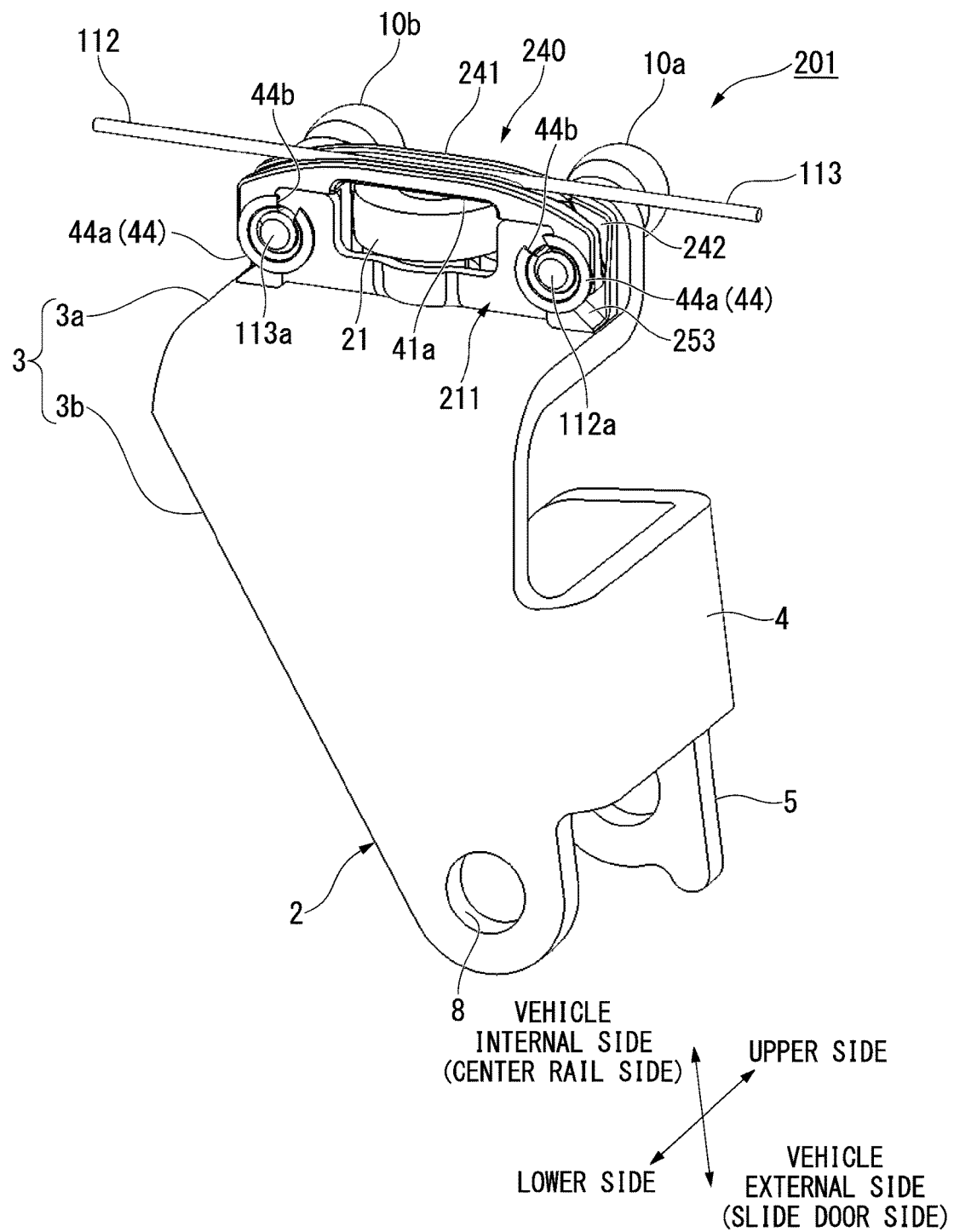
FIG. 9 is a perspective view of the roller unit according to the second embodiment of the present invention when seen from below.
Figure 10:
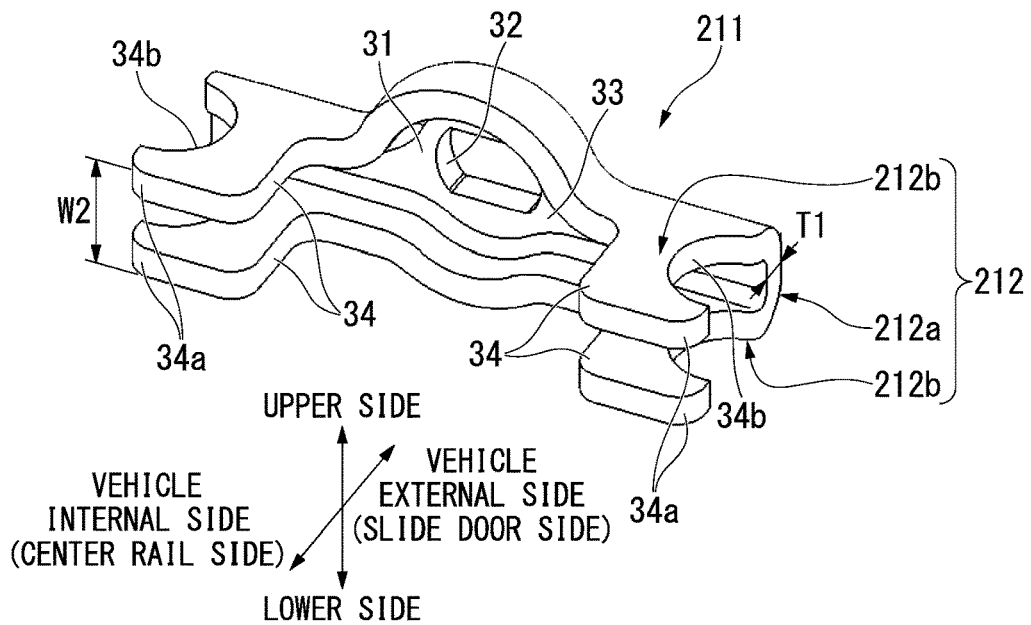
FIG. 10 is a perspective view of a cable holder according to the second embodiment of the present invention.
Figure 11:
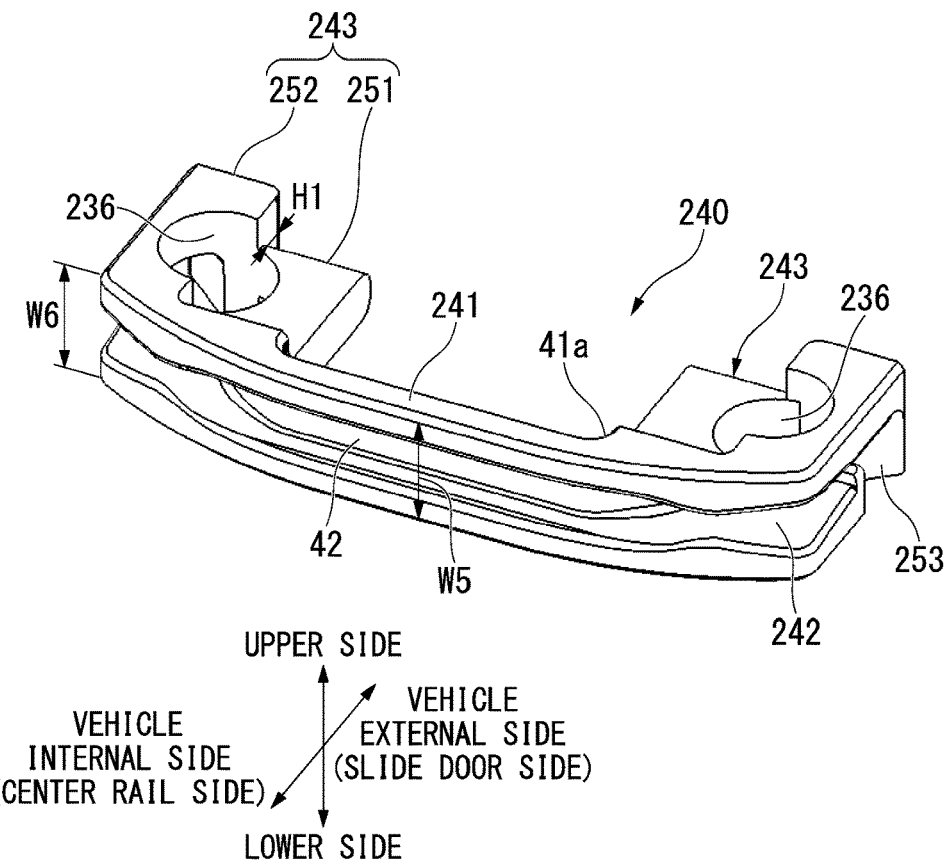
FIG. 11 is a perspective view of a cable guide according to the second embodiment of the present invention.
Figure 12:
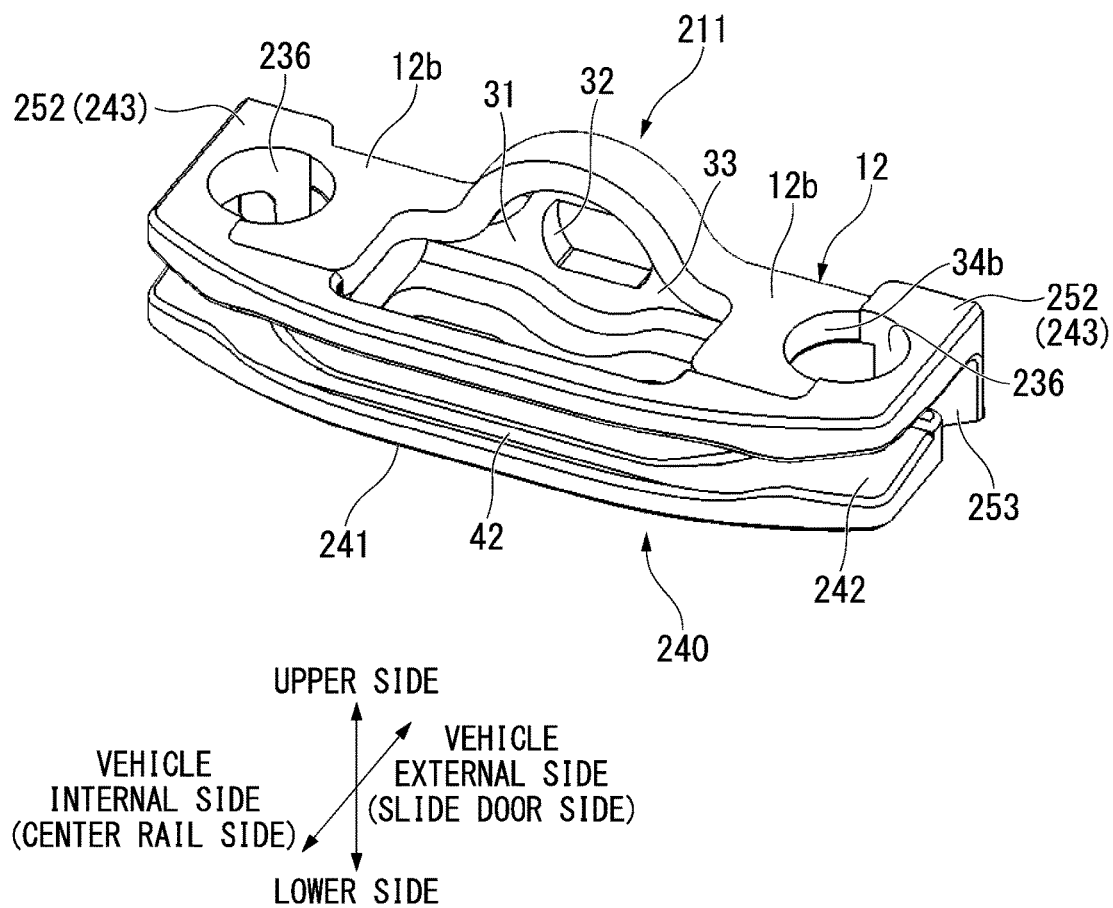
FIG. 12 is a perspective view showing a state in which the cable guide is attached to the cable holder according to the second embodiment of the present invention.

FIG. 8 is a perspective view of a roller unit 201 when seen from above, corresponding to FIG. 3. FIG. 9 is a perspective view of the roller unit 201 when seen from below, corresponding to FIG. 4 described above. FIG. 10 is a perspective view of a cable holder 211, corresponding to FIG. 5 described above. FIG. 11 is a perspective view of a cable guide 240, corresponding to FIG. 6 described above. FIG. 12 is a perspective view showing a state in which the cable guide 240 is attached to the cable holder 211, corresponding to FIG. 7 described above.

As shown in FIGS. 8 to 12, the above-mentioned first embodiment is distinguished from the second embodiment in that a shape of the cable holder 11 of the first embodiment is different from a shape of the cable holder 211 of the second embodiment and a shape of the cable guide 40 of the first embodiment is different from a shape of the cable guide 240 of the second embodiment.

(Cable Holder)

As shown in FIGS. 8 to 10, the cable holder 211 is formed by a metal plate or the like being pressed and integrated with the base bracket 2 by welding or the like.

The cable holder 211 has a holder base 212 formed to be elongated in the widthwise direction of the base bracket 2. The holder base 212 is formed in a substantially reversed C-shaped cross section, and constituted by a bottom wall 212a in contact with the base bracket 2, and two sidewalls 212b formed to be erect in the short direction from both sides of the bottom wall 212a.

Here, the sidewalls 212b do not include the cable hook 35 like the above-mentioned first embodiment and include only the cable end holding section 34. An arc surface 34b corresponding to a portion of the cable end insertion hole 36 of the above-mentioned first embodiment is formed in the cable end holding section 34.

(Cable Guide)

As shown in FIGS. 8, 9, 11 and 12, the cable guide 240 is formed of a resin and is integrally formed by a guide main body 241 having a substantially rectangular parallelepiped shape formed to be elongated in a longitudinal direction of the cable holder 211, and leg sections 243 protruding from both ends of the guide main body 241 in the longitudinal direction. A width W5 of the guide main body 241 in the short direction (the upward/downward direction in 11) is set to be substantially equal to the width W2 of the cable holder 211 in the short direction (the upward/downward direction in FIG. 10).

Here, the leg sections 243 are integrally formed of leg section main bodies 251 disposed at sides at which the two leg sections 243 face each other, and slip preventing mechanisms 252 disposed at sides opposite the facing sides. The leg section main bodies 251 correspond to the leg sections 43 of the above-mentioned first embodiment. That is, when the cable guide 240 is attached to the cable holder 211, the leg section main bodies 251 are inserted between the sidewalls 212b (between the cable end holding sections 34) of the cable holder 211. Meanwhile, the slip preventing mechanisms 252 are disposed outside in the longitudinal direction farther than the sidewalls 212b of the cable holder 211.

A width W6 of the slip preventing mechanism 252 in the thickness direction is set to be equal to the width W5 of the guide main body 241 in the short direction (the upward/downward direction of FIG. 6). In addition, the slip preventing mechanism 252 protrudes toward a vehicle exterior side (toward the base bracket 2) farther than the leg section main body 251. A protrusion height H1 of the slip preventing mechanism 252 from the leg section main body 251 is set to be substantially equal to a thickness T1 of the bottom wall 212a of the holder base 212. That is, when the cable guide 240 is attached to the cable holder 211, a tip of the slip preventing mechanism 252 abuts the base bracket 2.

A cable end insertion hole 236 is formed in a central section of the leg section 243, i.e., a boundary section between the leg section main body 251 and the slip preventing mechanism 252. In a state in which the cable guide 240 is attached to the cable holder 211, an inner circumferential edge of the cable end insertion hole 236 is formed along the arc surface 34b of the cable end holding section 34.

In addition, an auxiliary groove 242 is formed in the slip preventing mechanism 252 at a place corresponding to the guide groove 42 of the guide main body 241. The auxiliary groove 242 is configured to be continuous with the guide groove 42, and an opposite side of the guide groove 42 is continuous with the cable end insertion hole 236. Further, the auxiliary groove 242 extends toward the bottom wall 12a (the vehicle exterior side in FIG. 11) of the cable holder 211, and is formed to be bent downward from just before the tip of the leg section 243. For this reason, as shown in FIG. 9 in detail, a slit 253 extending to be inclined outward from the cable end insertion hole 236 is formed in a lower surface of the leg section 243.

(Assembly Method of Roller Unit and Action of Roller Unit)

Next, an assembly method of the roller unit 201 and an action of the roller unit 201 will be described. Further, these are the same as the above-mentioned first embodiment in that the horizontal rollers 10a and 10b and the vertical roller 21 are pre-assembled to the base bracket 2.

First, the cable guide 240 is attached to the cable holder 211 and the collar 44 is inserted into the cable end insertion hole 236. Here, a position of the slit 44b formed in the collar 44 is matched to a position of the slit 253 in the cable holder 211, and the collar 44 is inserted into the cable end insertion hole 236.

Next, the cable ends 112a and 113a of the cables 112 and 113 are inserted into the cable end insertion holes 236. Here, the cable ends 112a and 113a are inserted from the slit 253 side of the cable holder 211 such that the cables 112 and 113 pass through the slit 253.

In addition, first, when the cable ends 112a and 113a of the cables 112 and 113 are inserted into the cable end insertion holes 236, the base bracket 2 is set upside down from a normal orientation. Then, the cable ends 112a and 113a are inserted into the cable end insertion holes 236 disposed at a drawing-out direction side of the corresponding cables 112 and 113. After that, as the base bracket 2 is twisted to the normal orientation, the cables 112 and 113 intersect with each other over the cable guide 240 and are received in the guide groove 42 of the cable guide 240.

In a state in which the cable ends 112a and 113a are inserted into the cable end insertion holes 236, the cable ends 112a and 113a are pivotable with respect to the cable end insertion holes 236. For this reason, when the base bracket 2 is turned to the normal orientation, the cable ends 112a and 113a are pivoted.

In addition, the auxiliary groove 242 communicating with the guide groove 42 of the guide main body 241 is formed in the slip preventing mechanism 252 of the cable holder 211. For this reason, the cables 112 and 113 passing through the slit 253 can be guided to the guide groove 42. Accordingly, the cables 112 and 113 can easily cross without twisting.

After the cable ends 112a and 113a are attached to the cable holder 211 and an orientation of the base bracket 2 is set to the normal orientation, the roller unit 201 is attached to the center rail 106. Accordingly, assembly of the roller unit 1 is terminated.

Here, the cables 112 and 113 at a place at which the cables are received in the guide groove 42 of the cable guide 240 are deviated in a direction receding from the bottom wall 12a (the base bracket 2) of the cable holder 211 farther than a position to which the cable ends 112a and 113a are attached. In other words, the cables 112 and 113 at the place, at which the cables are received in the guide groove 42 of the cable guide 240, are wired in shapes offset from the position, to which the cable ends 112a and 113a are attached, toward the center rail 106 side.

For this reason, when tensile forces are applied to the cables 112 and 113, a pressing force directed toward the bottom wall 12a (the base bracket 2) of the cable holder 11 is applied to the guide main body 41. The pressing force is distributed to the leg sections 243, and further, the cable holder 11 and the base bracket 2 receive the pressing force.

In addition, since the cables 112 and 113 at the place, at which the cables are received in the guide groove 42 of the cable guide 240, are wired in shapes offset from the position, to which the cable ends 112a and 113a are attached, toward the center rail 106 side, it is possible to make the cables 112 and 113 as close as possible to the center rail 106.

In addition, since the cables 112 and 113 intersect over the cable guide 40, the cable ends 112a and 113a press the cable end holding section 34 when the tensile forces are applied to the cables 112 and 113. That is, the cable end holding section 34 receives loads of the cable ends 112a and 113a and holds the cable ends 112a and 113a since the side surface opposite the cable hook 35 in the longitudinal direction is formed in an arc shape.

Here, the leg sections 243 of the cable guide 240 are constituted by the leg section main bodies 251 and the slip preventing mechanisms 252, and the cable end insertion holes 236 are formed in central sections of the leg sections 243, i.e., boundary sections between the leg section main bodies 251 and the slip preventing mechanisms 252. Then, since the cable ends 112a and 113a are inserted into the cable end insertion holes 236, the leg section main bodies 251 sides become directions of loads applied to the cable ends 112a and 113a. Since the loads are received by the cable end holding sections 34 of the cable holder 211, the leg section main bodies 251 function to prevent falling of the cable guide 240 from the cable holder 211.

Meanwhile, the slip preventing mechanisms 252 disposed at sides opposite to the direction of the loads applied to the cable ends 112a and 113a function to prevent falling of the cable ends 112a and 113a from the leg section main body 251. In this way, the cable end holding sections 34 of the cable holder 211, the leg section main bodies 251 and the slip preventing mechanisms 252 of the cable guide 240, and the cable ends 112a and 113a cooperate with each other to be integrated.

In the above-mentioned second embodiment, only the cable end holding sections 34 are formed at the sidewalls 212b of the cable holder 211 but the cable hook 35 is not formed. Meanwhile, the leg sections 243 of the cable guide 240 are constituted by the leg section main bodies 251 and the slip preventing mechanisms 252, and have a role of the cable hooks 35 of the above-mentioned first embodiment in the slip preventing mechanisms 252.

Accordingly, according to the above-mentioned second embodiment, the same effects as the above-mentioned first embodiment can be exhibited. In addition, as the leg sections 243 are constituted by the leg section main bodies 251 and the slip preventing mechanisms 252, stiffness of the cable guide 240 can be increased while suppressing an increase in size of the roller unit 201.

(Third Embodiment)
(Roller Unit)

Next, a third embodiment of the present invention will be described based on FIGS. 13 to 17.

Figure 13:
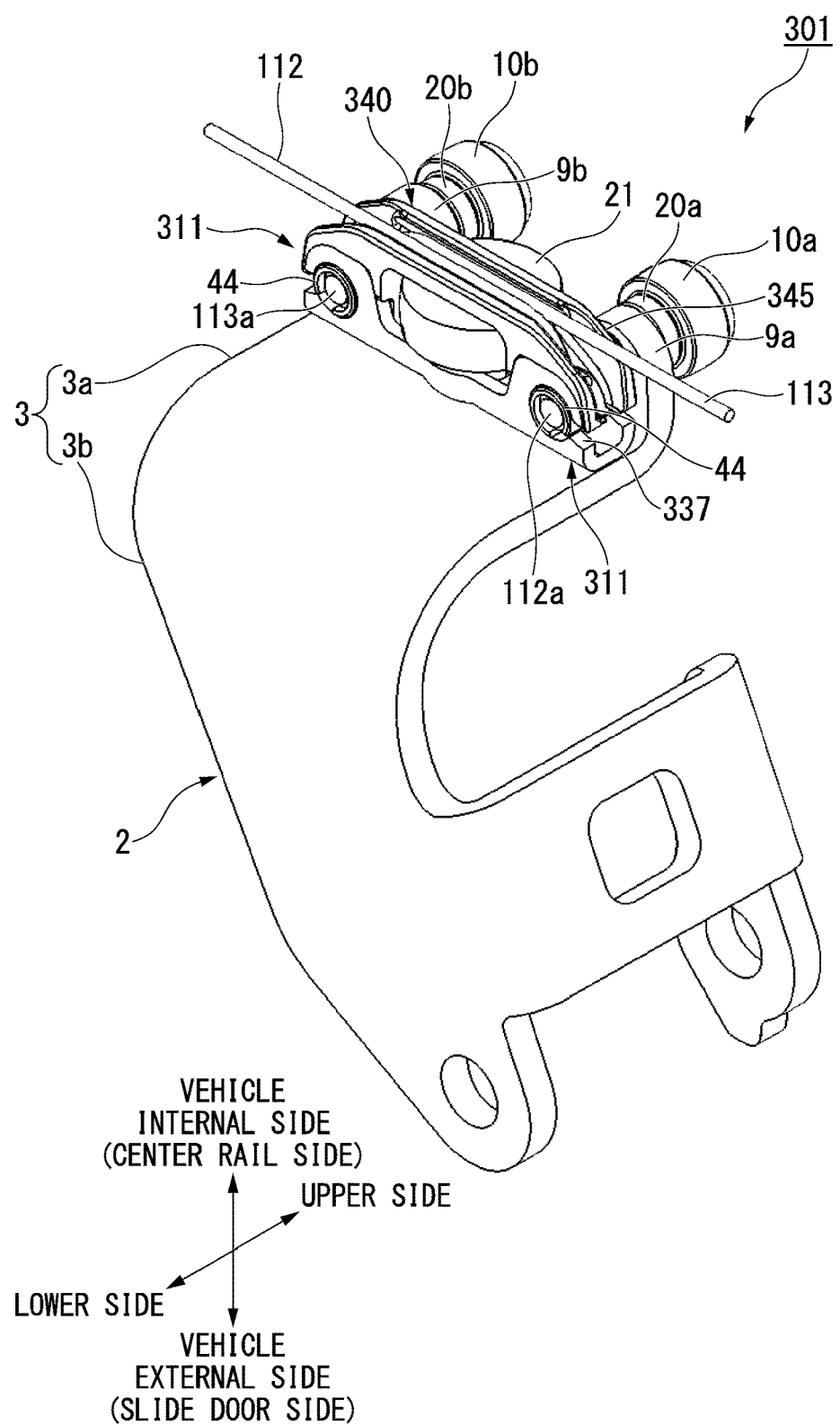
FIG. 13 is a perspective view of a roller unit according to a third embodiment of the present invention when seen from below.

FIG. 13 is a perspective view of a roller unit 301 when seen from below, corresponding to FIG. 4 described above.

As shown in FIG. 13, the third embodiment is distinguished from the above-mentioned first embodiment in that the shape of the cable holder 11 of the first embodiment is different from a shape of a cable holder 311 of the third embodiment and the shape of the cable guide 40 of the first embodiment is different from a shape of a cable guide 340 of the third embodiment.

(Cable Holder)

Figure 14:
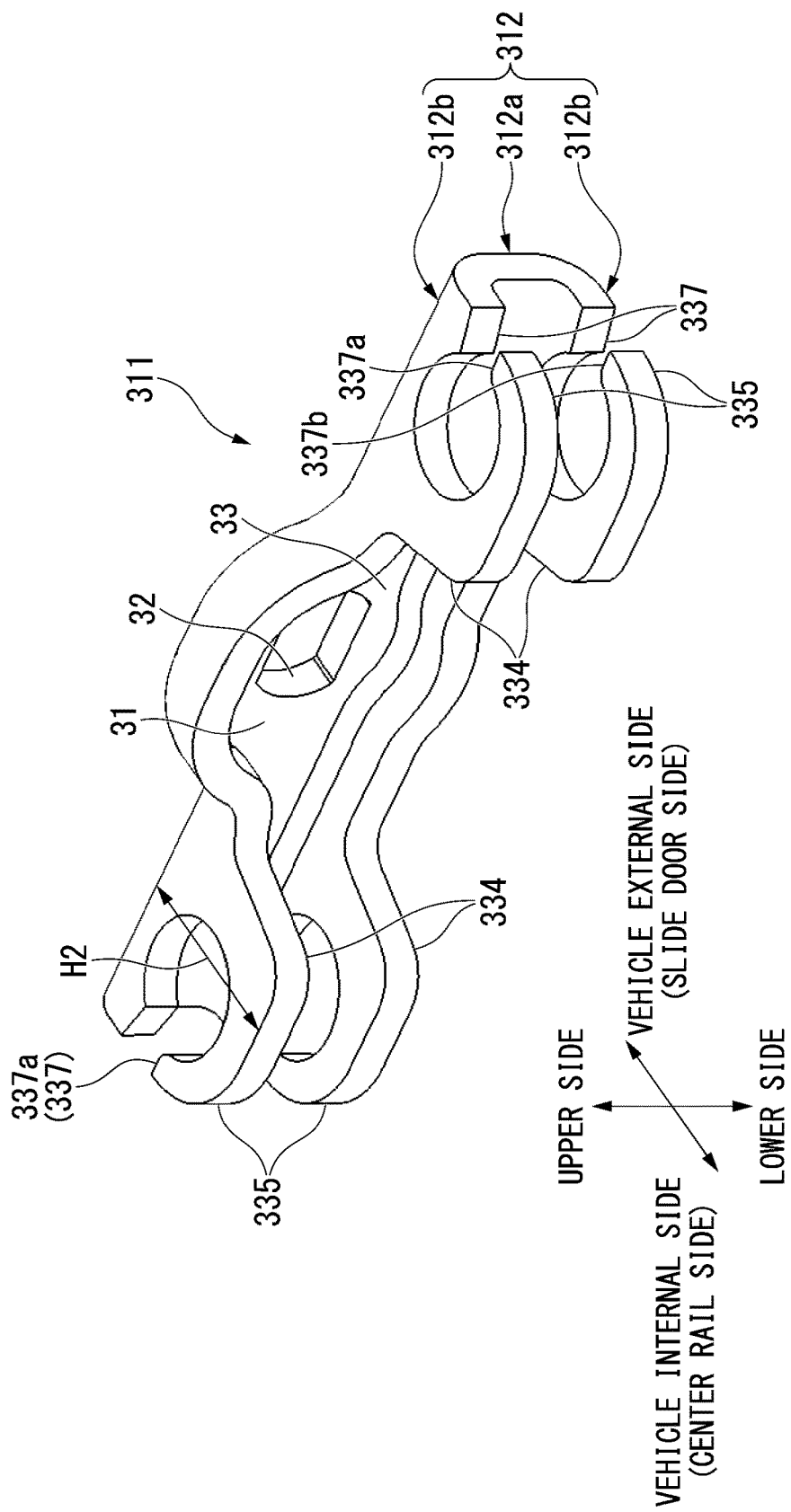
FIG. 14 is a perspective view of a cable holder according to the third embodiment of the present invention.

FIG. 14 is a perspective view of the cable holder 311, corresponding to FIG. 5 described above.

As shown in FIGS. 13 and 14, the cable holder 311 is formed by a metal plate or the like being pressed and integrated with the base bracket 2 by welding or the like.

The cable holder 311 has a holder base 312 formed to be elongated in the widthwise direction of the base bracket 2. The holder base 312 is formed in a substantially reversed C-shaped cross section and is constituted by a bottom wall 312a in contact with the base bracket 2 and two sidewalls 312b formed to be erecting in a short direction from both sides of the bottom wall 312a.

Since a shape of the bottom wall 312a is the same as that of the bottom wall 12a of the above-mentioned first embodiment, the same components are designated and not described by the same reference numerals as the bottom wall 12a of the above-mentioned first embodiment.

Meanwhile, shapes of the sidewalls 312b of both end sides in the longitudinal direction are different from the shapes of the above-mentioned first embodiment. Hereinafter, the shapes of the sidewalls 312b will be described in detail.

A height H2 of the sidewalls 312b is set to be substantially equal to a height of an end surface of the vertical roller 21 on the center rail 106 side. In addition, the sidewalls 312b are formed in a substantially C shape such that an outer side thereof in the longitudinal direction is open when seen in a plan view in the upward/downward direction. Then, the sidewalls 312b are constituted by cable end holding sections 334 disposed at a central side in the longitudinal direction and cable hooks 335 disposed at both end sides in the longitudinal direction.

In each of the sidewalls 312b, a slit 337 is formed at a place that constitutes the cable hook 335 at a substantial center thereof in a vehicle width direction. Accordingly, the cable end holding sections 334 and the cable hooks 335 are formed in a substantially C shape as a whole. Then, the cables 112 and 113 are inserted from an outside of the sidewalls 312b to an inside thereof in the upward/downward direction via the slits 337 of the cable hooks 335. The cable guide 340 is attached to the cable holder 311 configured as above.

(Cable Guide)

Figure 15:
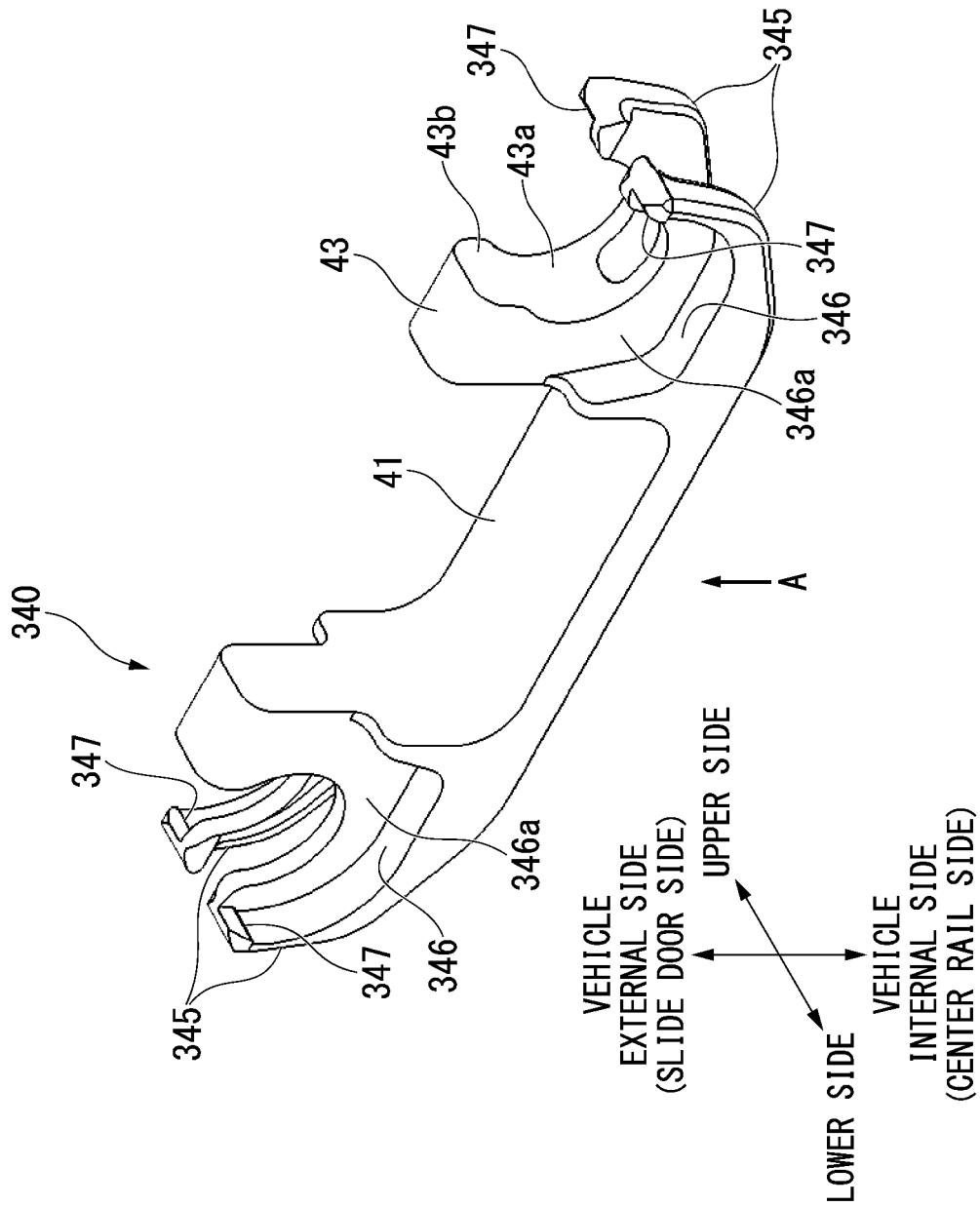
FIG. 15 is a perspective view of a cable guide according to the third embodiment of the present invention.
Figure 16:
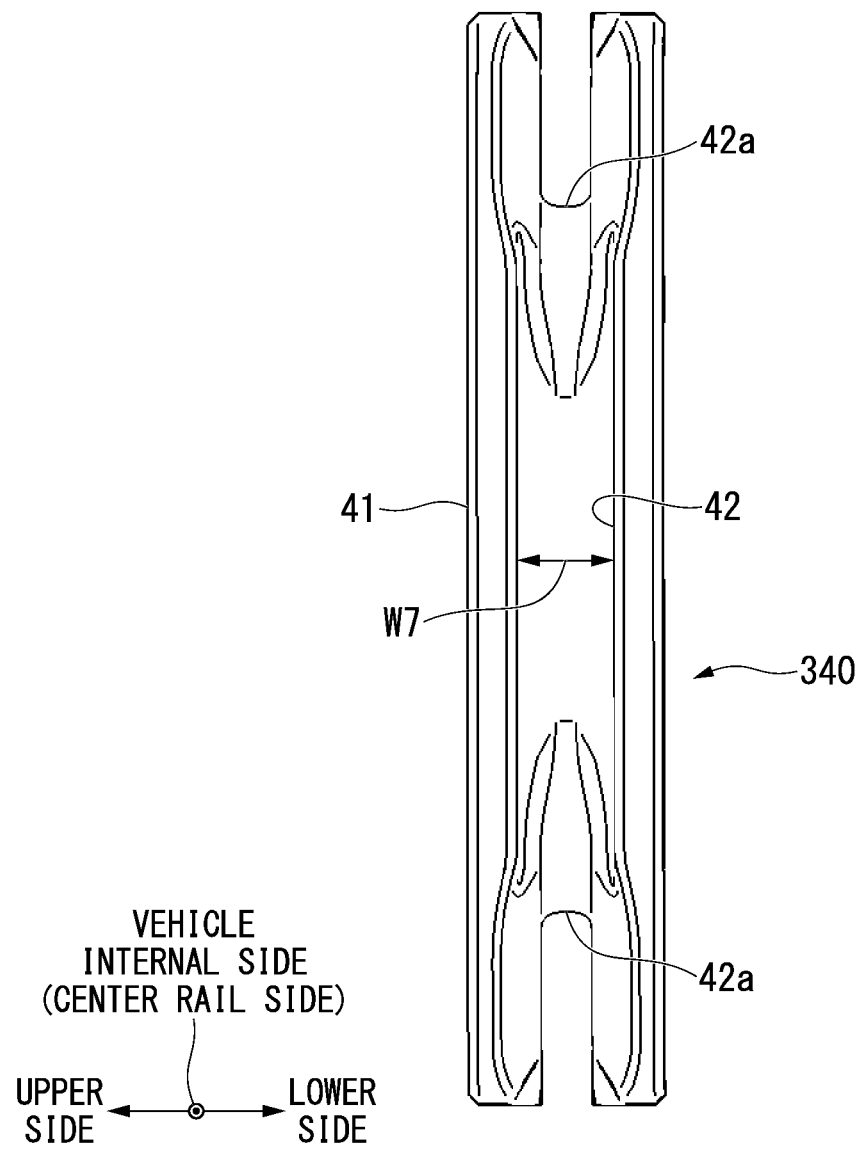
FIG. 16 is a view seen from an arrow A of FIG. 15.
Figure 17:
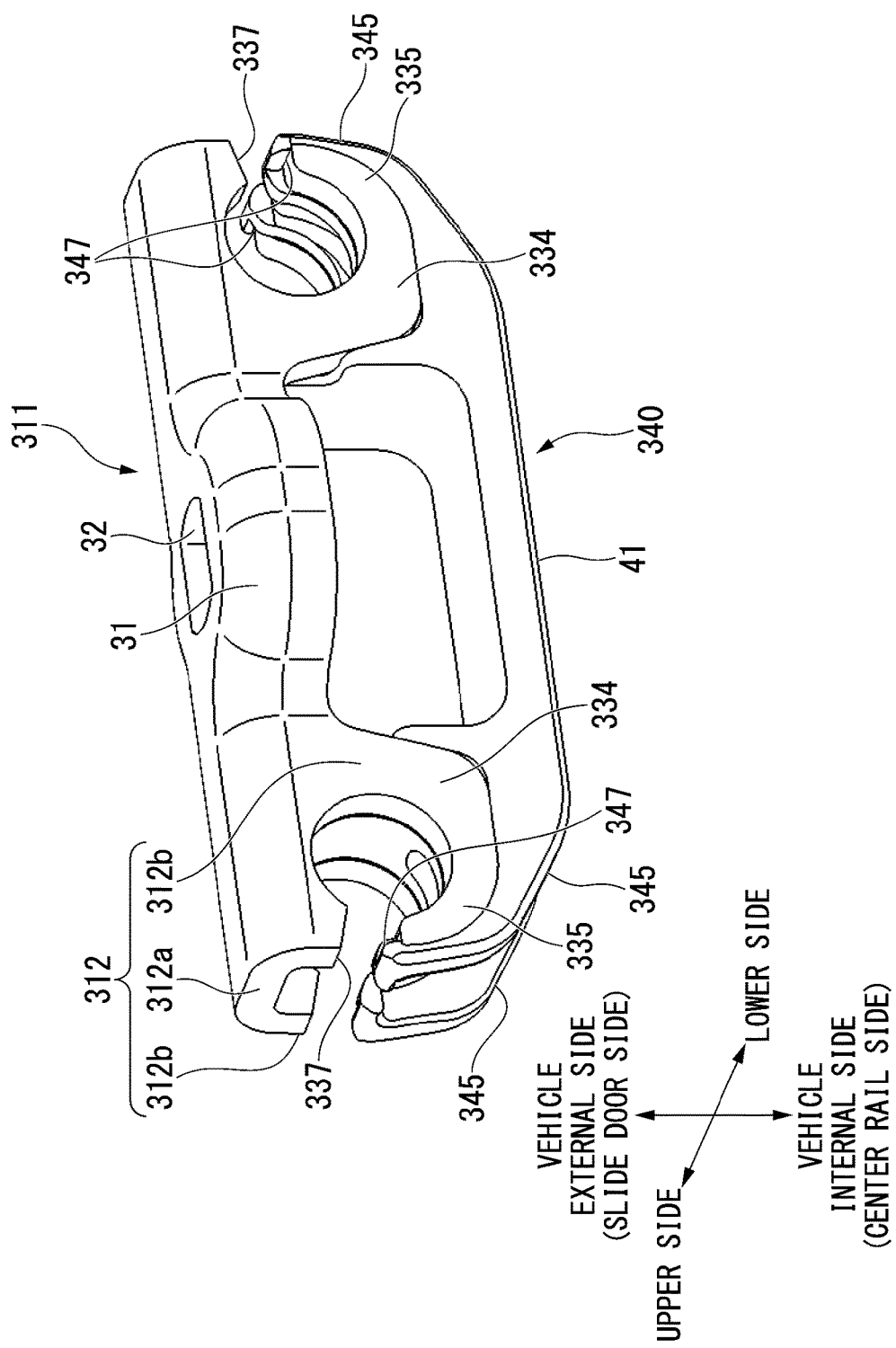
FIG. 17 is a perspective view showing a state in which the cable guide is attached to the cable holder according to the third embodiment of the present invention.

FIG. 15 is a perspective view of the cable guide 340. FIG. 16 is a view when seen from an arrow A of FIG. 15. FIG. 17 is a perspective view showing a state in which the cable guide 340 is attached to the cable holder 311, corresponding to FIG. 7 described above.

As shown FIGS. 15 and 16, a basic configuration of the cable guide 340 is the same as that of the cable guide 40 of the above-mentioned first embodiment. For this reason, the same components as the cable guide 40 of the above-mentioned first embodiment are designated by the same reference numerals as the cable guide 40 and descriptions thereof will be omitted.

Further, as shown in FIG. 16 in detail, cable grooves 42a for each of the cables 112 and 113 are formed at both ends in the longitudinal direction of the guide groove 42 formed in the guide main body 41. The cable grooves 42a are formed in a substantial center of the guide groove 42 in the short direction. In addition, a width W7 of the cable groove 42a in the short direction is set to be a width of the two cables 112 and 113. Since the cable grooves 42a are formed, the cables 112 and 113 guided to the guide groove 42 do not deviate from the guide groove 42.

Here, as shown in FIGS. 15 and 16, cable introducing sections 345 are integrally formed in the cable guide 340 of the third embodiment at both ends of the guide main body 41 in the longitudinal direction and both ends of the guide main body 41 in the short direction. This is a point of difference with the cable guide 40 of the above-mentioned first embodiment.

The cable introducing sections 345 extend while being curved and inclined in a longitudinal direction of the guide main body 41 and toward the longitudinal wall 3a of the base main body 3. In other words, the cable introducing sections 345 extend from the slit 337 of the cable hook 335 while being curved and inclined along a shape of the center rail 106 side. In addition, the cable introducing sections 345 are formed such that tips thereof are disposed at substantially the same positions as those of inner side surfaces 337a of the slits 337 on the center rail 106 side.

Further, concave sections 346 are formed at outer surfaces of the cable introducing sections 345 in the upward/downward direction. The concave sections 346 are formed to correspond to shapes of the sidewalls 312b of the cable holder 311 on the center rail 106 side. Surfaces 346a of the concave sections 346 in the upward/downward direction are formed to be flush with surfaces of the leg sections 43. Accordingly, as shown in FIG. 17 in detail, when the cable guide 340 is attached to the cable holder 311, halves of the sidewalls 312b on the center rail 106 side are inserted into the concave sections 346 of the cable guide 340.

In other words, the halves of the sidewalls 312b on the center rail 106 side are in a state in which outer circumferential surfaces and inner side surfaces of the sidewalls 312b opposing each other in the upward/downward direction are covered with the cable introducing sections 345.

Here, claw sections 347 configured to be engaged with the slits 337 of the cable hooks 335 are formed integrally with tips of the cable introducing sections 345. The claw sections 347 extend from the tips of the cable introducing sections 345 to cover the inner side surfaces 337a of the slits 337 on the center rail 106 side. Accordingly, the inner side surfaces 337a of the slits 337 and corner sections (edges) 337b of the slits 337 on the cable introducing sections 345 side are covered by the cable introducing sections 345.

In this way, the cable introducing sections 345 are formed integrally with the cable guide 340 of the above-mentioned third embodiment at both ends of the guide main body 41 in the longitudinal direction, and at both ends of the guide main body 41 in the short direction. For this reason, when the cables 112 and 113 are wired, the cables 112 and 113 can be easily guided to the guide groove 42 of the guide main body 41 using the cable introducing sections 345 as guides.

Moreover, the cable introducing sections 345 are formed to extend to cover the outer circumferential surfaces and the inner side surfaces of the sidewalls 312b opposing each other in the upward/downward direction in halves of the sidewalls 312b of the cable holder 311 on the center rail 106 side. For this reason, since displacement of the cables 112 and 113 is restricted by the formation of the cable introducing sections 345, when the roller unit 301 is operated, it is possible to prevent rubbing of the cables 112 and 113 against the cable holder 311. For this reason, damage to the cables 112 and 113 can also be prevented.

In addition, the slits 337 are formed at places in the sidewalls 312b that constitute the cable hooks 335 at a substantial center in the vehicle width direction. In other words, the slits 337 are formed in sides of the sidewalls 312b opposite to the places to which tensile forces of the cables 112 and 113 are applied. For this reason, during an operation of the roller unit 301, it is possible to prevent the cables 112 and 113 from deviating via the slits 337. That is, since the cables 112 and 113 are pulled toward opposite sides of the slits 337, the cables 112 and 113 do not approach the slit 337 sides. For this reason, it is possible to prevent the cables 112 and 113 from deviating from the slits 337.

Further, the claw sections 347 configured to be engaged with the slits 337 of the cable hooks 335 are formed integrally with the tips of the cable introducing sections 345. For this reason, the cable guide 340 can be securely attached to the cable holder 311. In addition, falling of the cable guide 340 from the cable holder 311 can be prevented.

Further, the claw sections 347 extend from the tips of the cable introducing sections 345 to cover the inner side surfaces 337a of the slits 337 on the center rail 106 side. Accordingly, the inner side surfaces 337a of the slits 337 and the corner sections (edges) 337b of the slits 337 on the cable introducing section 345 sides are covered by the cable introducing sections 345. For this reason, it is possible to prevent rubbing of the cables 112 and 113 against the slits 337 and damage to the cables 112 and 113.

In particular, the corner sections 337b of the slits 337 on the cable introducing section 345 sides are likely to be damaged due to being rubbed against the cables 112 and 113. As the such corner sections 337b on the cable introducing sections 345 sides are covered by the claw sections 347, damage to the cables 112 and 113 can be reliably prevented.

(Variant of Third Embodiment)

Next, a variant of the third embodiment will be described based on FIGS. 18 and 19.

Figure 18:
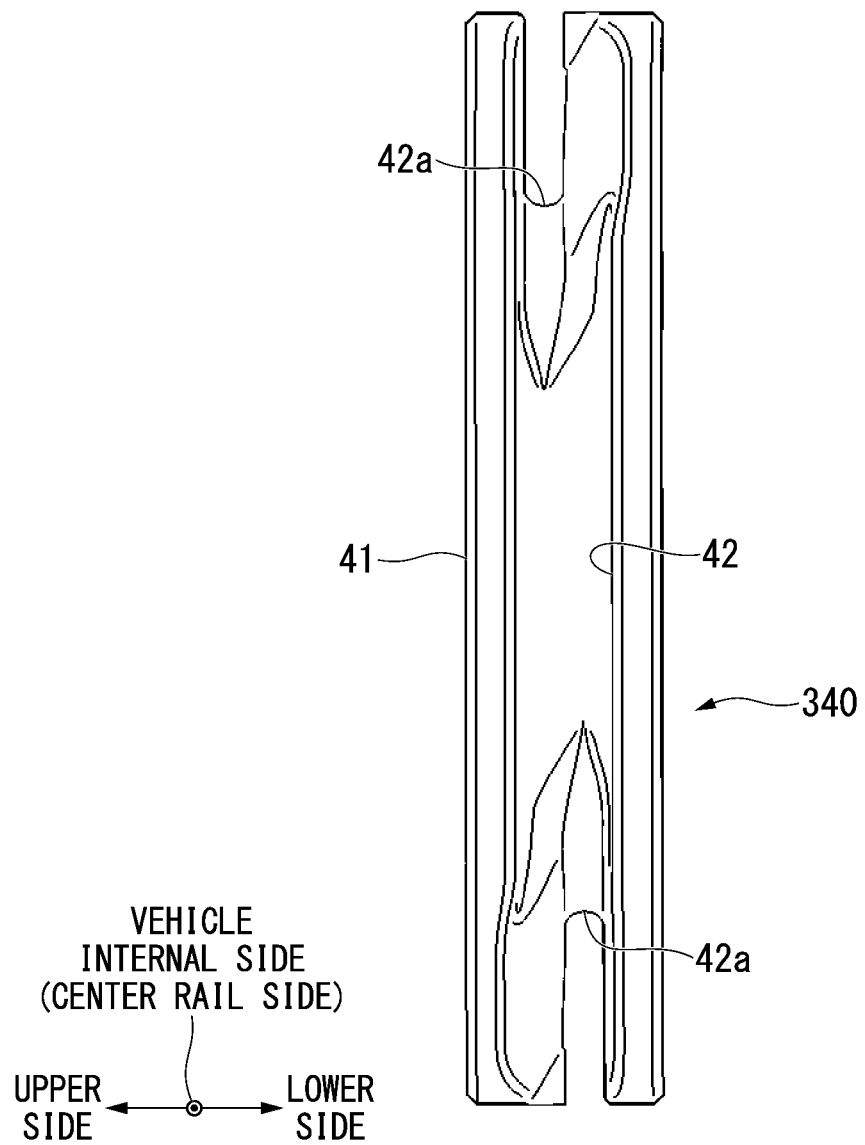
FIG. 18 is a plan view of a cable guide according to a variant of the third embodiment of the present invention.

FIG. 18 is a plan view of a cable guide 340 according to the variant of the third embodiment when seen from the center rail 106 side, corresponding to FIG. 16 described above. FIG. 19 is a plan view of a roller unit 301 according to the variant of the third embodiment when seen from the center rail 106 side.

As shown in the drawings, the cable groove 42a of the guide groove 42 formed in the cable guide 340 of the variant is formed toward one side of the guide groove 42 in the short direction without being formed at a substantial center of the guide groove 42 in the short direction.

Figure 19:
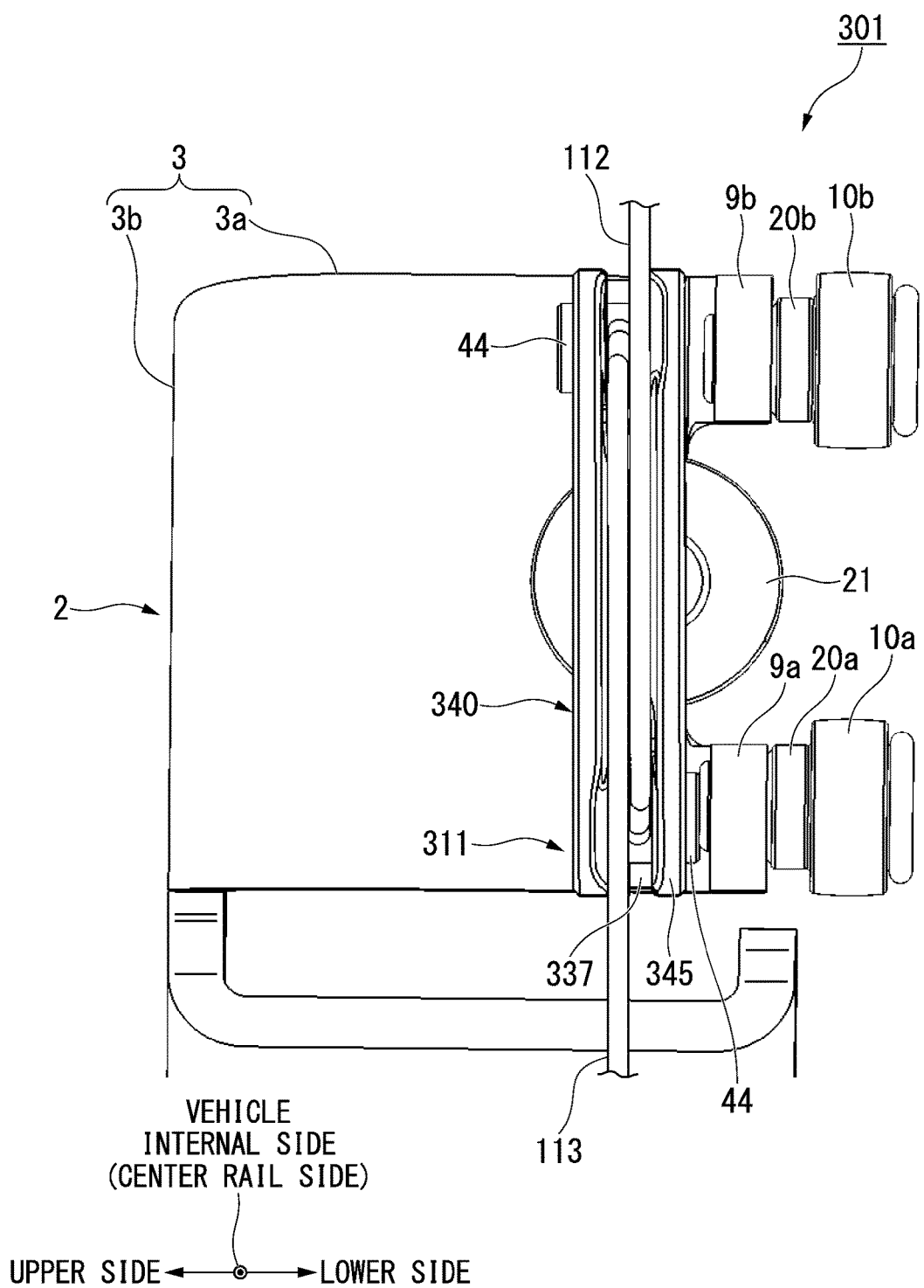
FIG. 19 is a plan view of a roller unit according to a variant of the third embodiment of the present invention.

For this reason, as shown in FIG. 19, the cables 112 and 113 are wired in a properly aligned state within the guide groove 42. Accordingly, it is possible to prevent damage to the cables 112 and 113 without the cables 112 and 113 being twisted or rubbed against each other. In addition, it is also possible to prevent generation of strange noises due to the cables 112 and 113 being rubbed against each other.

(Fourth Embodiment)
(Roller Unit)

Next, a fourth embodiment of the present invention will be described based on FIGS. 20 to 23.

Figure 20:
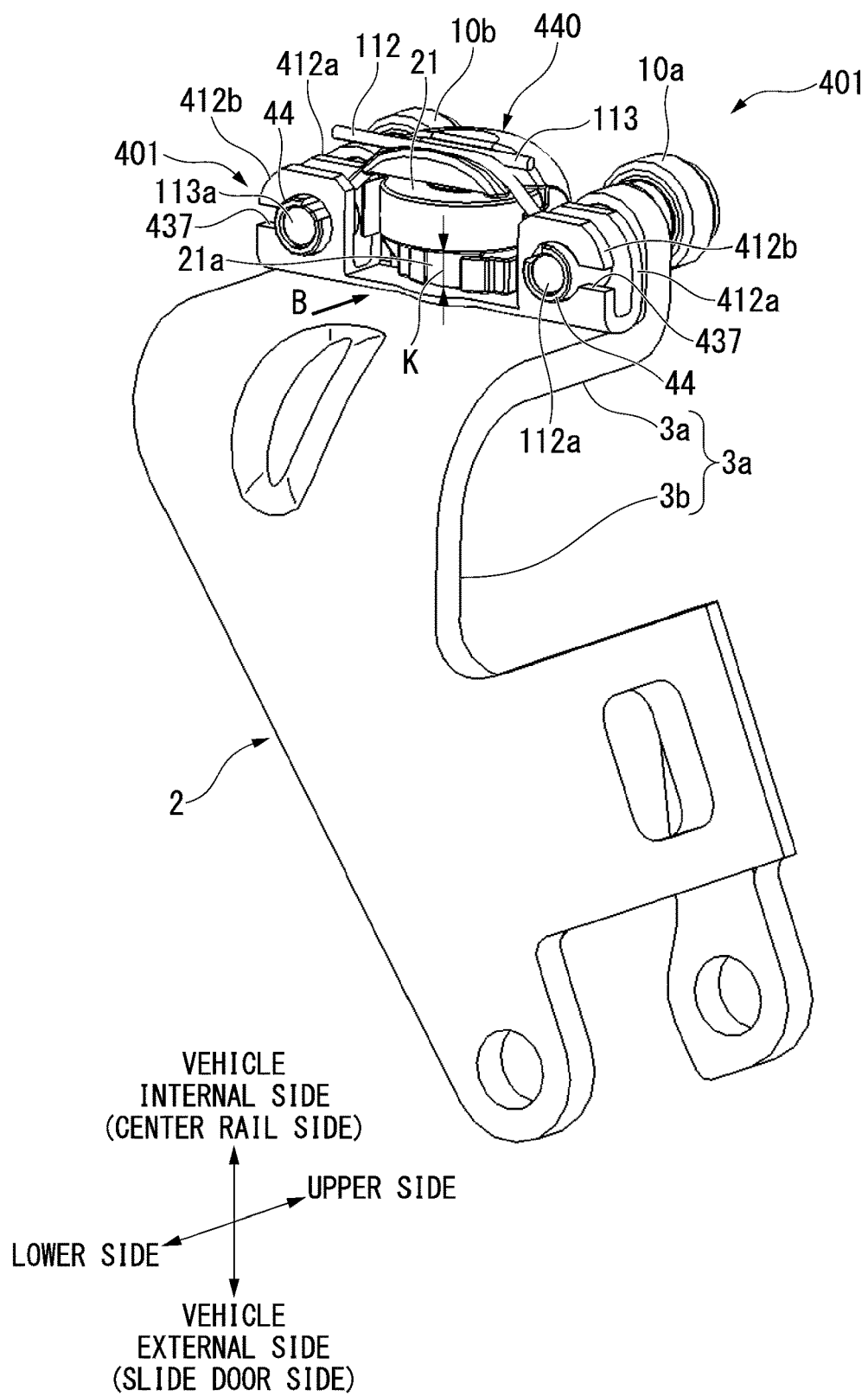
FIG. 20 is a perspective view of a roller unit according to a fourth embodiment of the present invention when seen from below.

FIG. 20 is a perspective view of a roller unit 401 when seen from below.

As shown in FIG. 20, the fourth embodiment is distinguished from the above-mentioned first embodiment in that the shape of the cable holder 11 of the first embodiment is different from a shape of a cable holder 411 of the fourth embodiment and the shape of the cable guide 40 of the first embodiment is different from a shape of a cable guide 440 of the fourth embodiment.

(Cable Holder)

Figure 21:
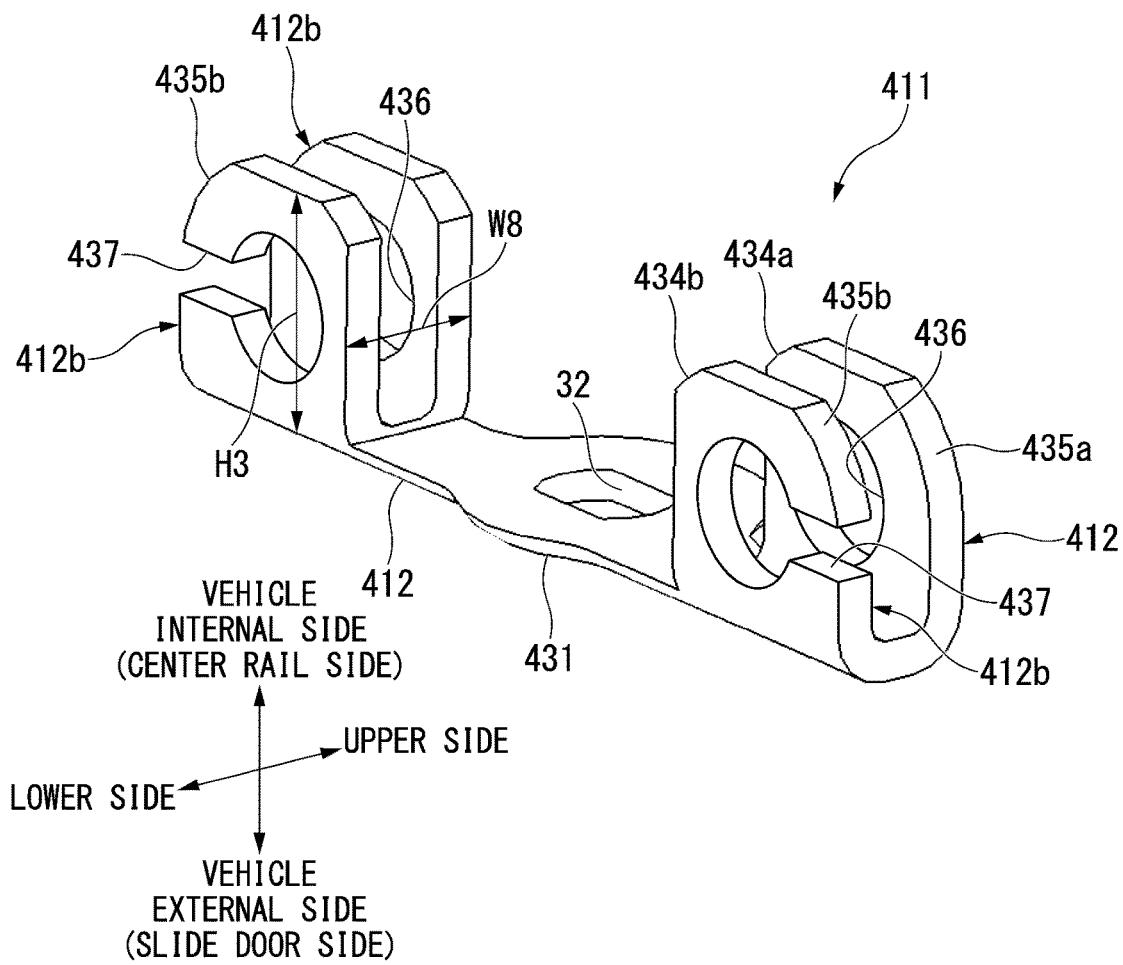
FIG. 21 is a perspective view of a cable holder according to the fourth embodiment of the present invention.

FIG. 21 is a perspective view of the cable holder 411.

As shown in FIGS. 20 and 21, the cable holder 411 is formed by a metal plate or the like being pressed and integrated with the base bracket 2 by welding or the like. The cable holder 411 has a holder base 412 formed to be elongated in the widthwise direction of the base bracket 2.

Most of the center of the holder base 412 is formed in a flat plate shape without being formed in a substantially reversed C-shaped cross section like the holder base 12 of the above-mentioned first embodiment. An enlarged base section 431 that swells slightly in the upward/downward direction is formed at a flat plate-shaped place. Then, the through-hole 32 having a substantially oval shape and passing in the thickness direction is formed in the enlarged base section 431.

The vertical roller 21 is installed at the enlarged base section 431. A configuration of the vertical roller 21 is the same as that of the vertical roller 21 of the above-mentioned first embodiment. For this reason, the cable holder 411 and the spindle 21a on which the vertical roller 21 is pivoted are integrated via the through-hole 32 of the enlarged base section 431. Then, since the enlarged base section 431 is formed in a flat plate shape, a gap K is formed between the enlarged base section 431 and the vertical roller 21.

A first sidewall 412a and a second sidewall 412b are erect in the longitudinal direction at both ends of the holder base 412, and both end sides in the short direction. A height H3 of the sidewalls 412a and 412b is set to be substantially equal to a height of the end surface of the vertical roller 21 on the center rail 106 side. In addition, a width W8 between the first sidewall 412a and the second sidewall 412b that oppose each other in the short direction of the cable holder 411 is set to be a width through which the cables 112 and 113 can be inserted.

The first sidewall 412a which is the sidewall of the two sidewalls 412a and 412b disposed on top is formed in a substantially quadrangular shape when seen in a plan view. In addition, cable end insertion holes 436 into which the cable ends 112a and 113a can be inserted are formed in a substantial center of the first sidewall 412a. Then, the first sidewall 412a functions as a cable end holding section 434a at a central side in the longitudinal direction about the cable end insertion hole 436 and functions as cable hooks 435a at both end sides in the longitudinal direction.

The second sidewall 412b which is the sidewall of the two sidewalls 412a and 412b disposed on the bottom is formed in a substantially C shape when seen in a plan view in the upward/downward direction. The second sidewall 412b is constituted by cable end holding sections 434b disposed at a central side in the longitudinal direction, and cable hooks 435 disposed at both end sides in the longitudinal direction.

Since the cable end holding section 434b and the cable hook 435b are formed in a substantially C shape as a whole, a slit 437 is formed at a place of the second sidewall 412b that constitutes the cable hook 435b at a substantial center in the vehicle width direction. The cables 112 and 113 are inserted inside the second sidewall 412b in the upward/downward direction from the outside via the slits 437. Then, the cable guide 440 is attached to the cable holder 411 configured as above.

(Cable Guide)

Figure 22:
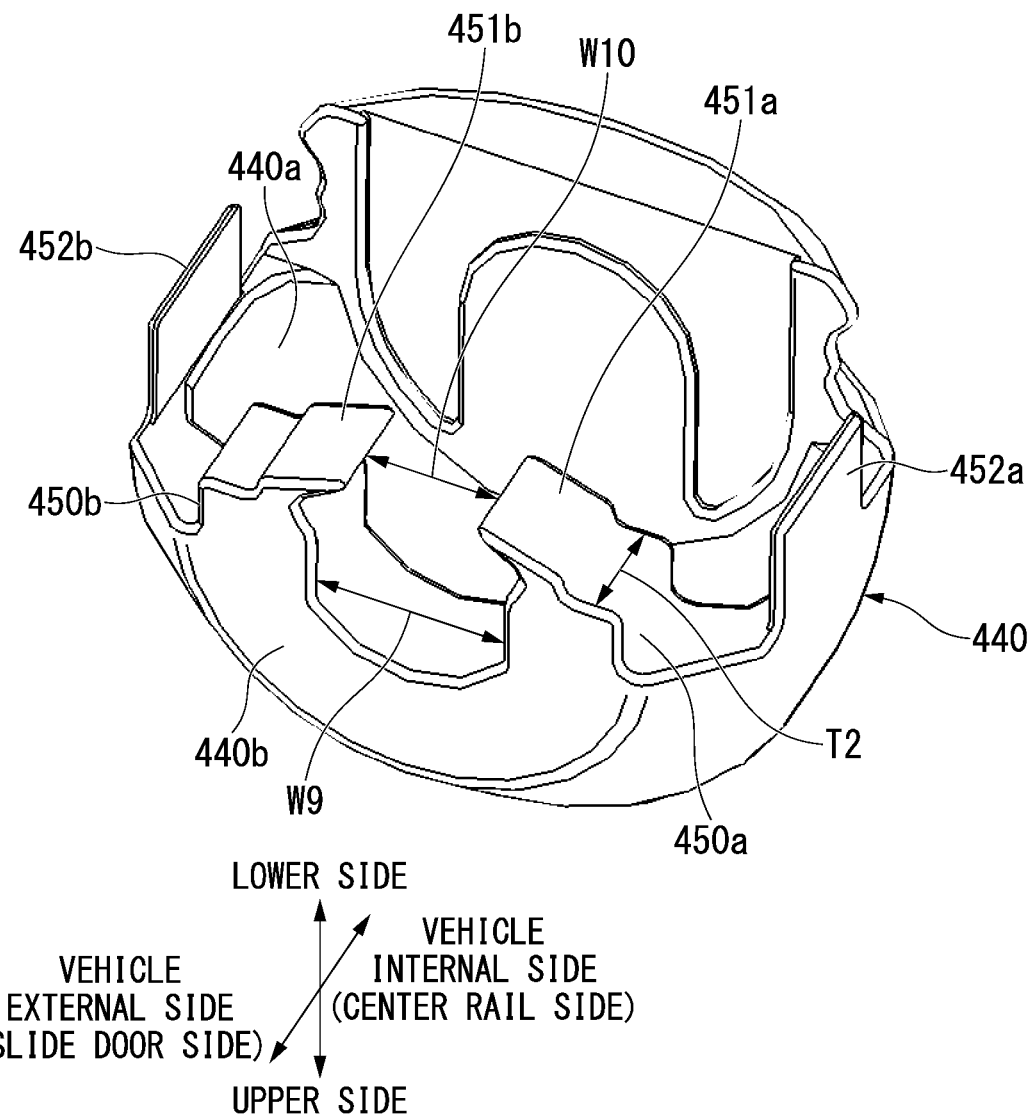
FIG. 22 is a perspective view of a cable guide according to the fourth embodiment of the present invention when seen from a slide door side.
Figure 23:
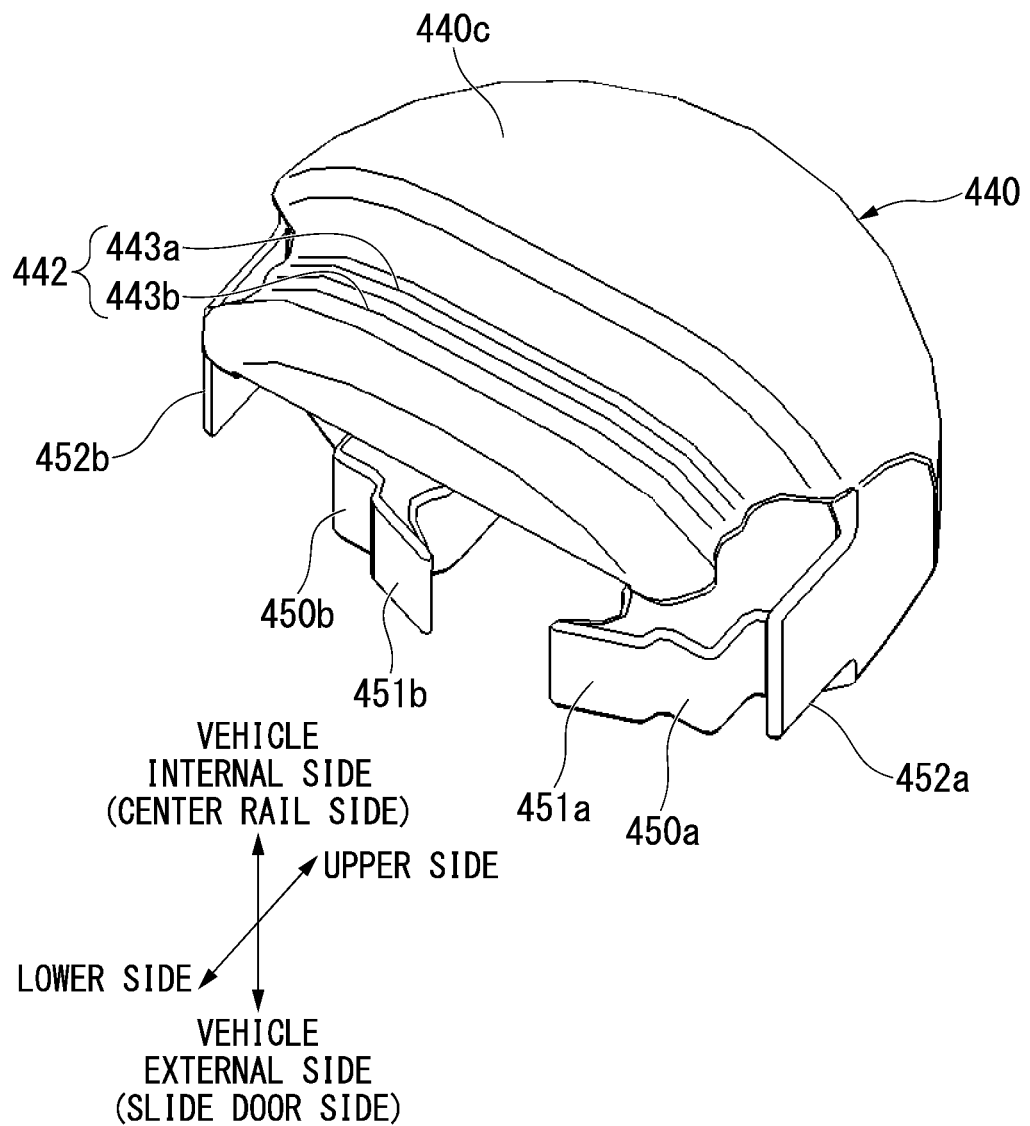
FIG. 23 is a perspective view of the cable guide according to the fourth embodiment of the present invention when seen from a center rail side.
Figure 24:
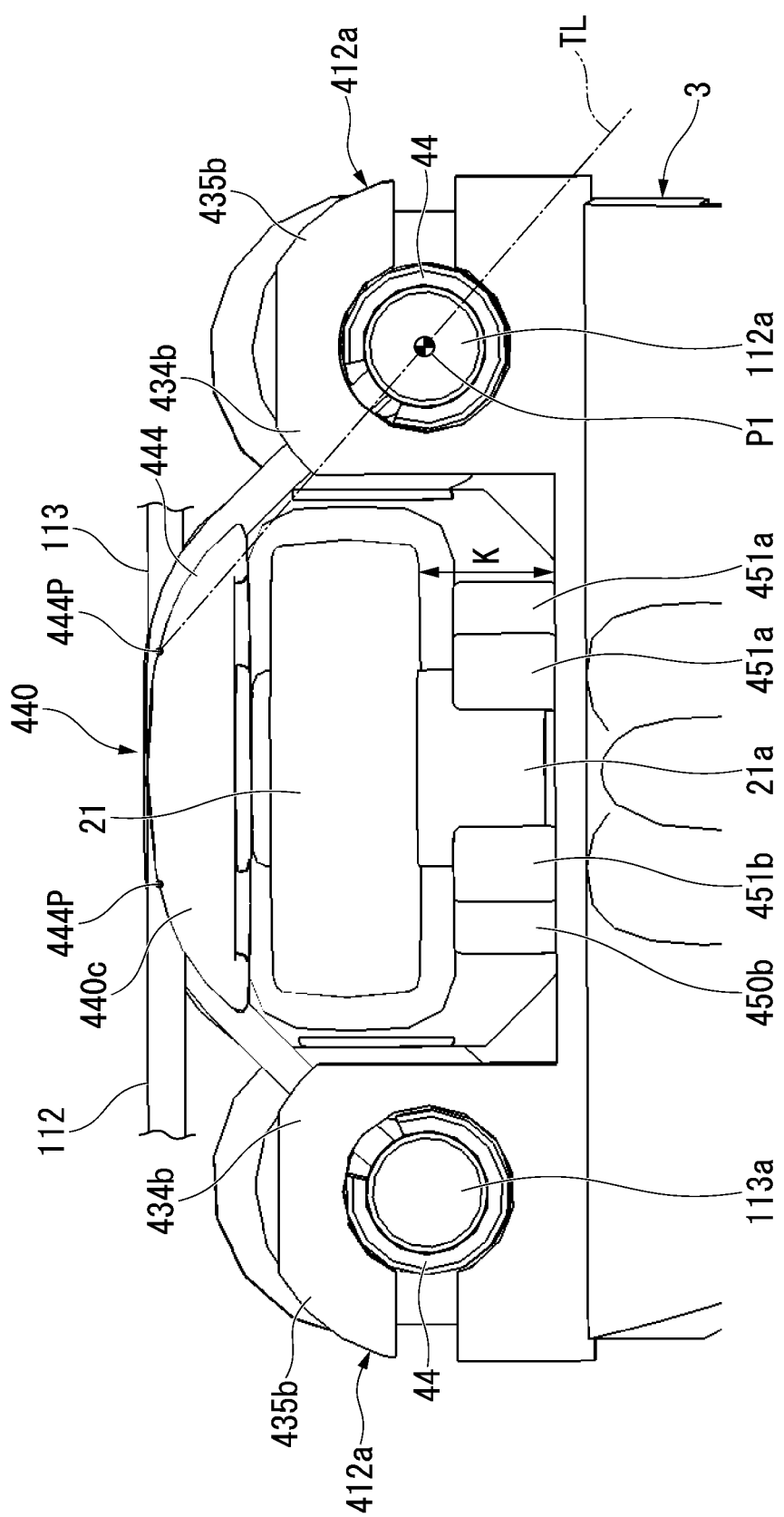
FIG. 24 is a view seen from an arrow B of FIG. 20.

FIG. 22 is a perspective view of the cable guide 440 when seen from the slide door 103 side. FIG. 23 is a perspective view of the cable guide 440 when seen from the center rail 106 side. FIG. 24 is a view from an arrow B of FIG. 20.

As shown in FIGS. 20, 22 and 24, the cable guide 440 is formed to surround the vertical roller 21 and is formed to have an open section 440a below the vertical roller 21.

A pair of convex sections 450a and 450b are formed integrally with a wall surface 440b of the cable guide 440 on the slide door 103 side to protrude downward. A width W9 between the pair of convex sections 450a and 450b is set to be slightly larger than or substantially equal to a shaft diameter of the spindle 21a. Further, a thickness T2 of the pair of convex sections 450a and 450b in an inward/outward direction of the vehicle is set to be slightly smaller than the gap K between the enlarged base section 431 of the cable holder 411 and the vertical roller 21.

For this reason, the cable guide 440 is attached in a shape in which the pair of convex sections 450a and 450b are interposed between the enlarged base section 431 of the cable holder 411 and the vertical roller 21 and in a shape in which the spindle 21a is disposed and fixed between the pair of convex sections 450a and 450b in a radial direction.

In addition, tongue sections 451a and 451b are formed integrally with tips of the pair of convex sections 450a and 450b. The tongue sections 451a and 451b extend toward opposite sides to be inclined along with the surroundings of the spindle 21a. A width W10 between tips of the tongue sections 451a and 451b is set to be smaller than the shaft diameter of the spindle 21a.

Here, the tongue sections 451a and 451b are formed to be deformable. For this reason, even when the width W10 between the tips of the tongue sections 451a and 451b is set to be smaller than the shaft diameter of the spindle 21a, the tongue sections 451a and 451b are elastically deformed when the tongue sections 451a and 451b are pushed against the spindle 21a. That is, the cable guide 440 is detachably attached to the spindle 21a (the cable holder 411 integrated with the spindle 21a) and snap-fitted and fixed to the spindle 21a.

In addition, a wall surface 440c of the cable guide 440 opposite to the convex sections 450a and 450b extends downward as a whole. A guide groove 442 is formed in an outer surface of an extended place on the center rail 106 side in the longitudinal direction of the cable holder 411. In the guide groove 442, two cable grooves 443a and 443b formed to correspond to diameters of the cables 112 and 113 are disposed in parallel.

In addition, tapered sections 444 are formed at both end sides of the wall surface 440c in the longitudinal direction to be inclined toward the base bracket 2. More specifically, the tapered section 444 is formed along a straight line TL that connects an apex 444P of the tapered section 444 and a center P1 between the cable ends 112a and 113a of the cables 112 and 113.

Further, a pair of sidewalls 452a and 452b extend from ends of the open section 440a of the cable guide 440 between the two wall surfaces 440b and 440c. Accordingly, most of the vertical roller 21 except for a portion of a lower side is covered by the cable guide 440.

Accordingly, according to the above-mentioned fourth embodiment, interference between the vertical roller 21 and the cables 112 and 113 can be reliably prevented by the cable guide 440, and damage to the cables 112 and 113 can be prevented. In addition, intrusion of a foreign substance into the vertical roller 21 from the outside can be suppressed. For this reason, generation of strange noises of the vertical roller 21 due to the foreign substance can be suppressed.

In addition, the tapered section 444 is formed at the wall surface 440c of the cable guide 440. For this reason, the cables 112 and 113 are smoothly wired in the guide groove 442 of the cable guide 440. That is, it is possible to suppress forcible folding of the cables 112 and 113. For this reason, damage to the cables 112 and 113 can be prevented.

Further, the present invention is not limited to the above-mentioned embodiments and further includes various modifications added to the above-mentioned embodiments without departing from the scope of the present invention. For example, the components of the embodiments or the variants may be combined to configure the roller unit.

In addition, in the above-mentioned embodiments, the case in which the cables 112 and 113 intersect over the cable guide 40 or 240 and the cables 112 and 113 are bundled and offset toward the center rail 106 by the cable guide 40 has been described. However, the cables are not limited thereto, and the cable guides may be installed at the respective cables 112 and 113, and the cables 112 and 113 may be separately offset. In this case, the cables 112 and 113 may be pulled out in the drawing-out direction without the cables 112 and 113 being intersected.

Further, in the above-mentioned embodiments, the case in which the cable holder 11 or 211 is formed in a substantially reversed C-shaped cross section has been described. However, the cable holder is not limited thereto and at least the sidewalls 12b of the holder base 12 or 212 may be provided. When the bottom wall 12a is not provided, the sidewalls 12b may be directly joined to the base bracket 2 by welding or the like. In addition, in this case, the tips of the leg sections 43 and 243 (the leg section main bodies 251) of the cable guide 40 or 240 are disposed and fixed between the base bracket 2 and the cable ends 112a and 113a.

Then, in the above-mentioned embodiment, the case in which the cable end 112a having a columnar shape is installed at the other end of the opening cable 112, the cable end 113a having a columnar shape is installed at the other end of the closing cable 113, and the cable ends 112a and 113a are attached to the cable holder 11 or 211 has been described. However, the shapes of the cable ends 112a and 113a are not limited to the columnar shape as far as the other ends of the cables 112 and 113 are pivotably attached to the cable holder 11 or 211. For example, the other ends of the cables 112 and 113 may be attached to the cable holder 11 or 211 by cable ends having a spherical shape instead of the columnar shape.

INDUSTRIAL APPLICABILITY

According to the above-mentioned roller unit, since only the cable guide can be formed separately from the bracket or the cable holder, time and labor of processing the parts can be saved. In addition, since it is only necessary for the cable guide to be attached to the cable holder, assemblability of the roller unit can be improved without performing time-consuming and laborious processing on the cable holder or the bracket being necessary.

Further, the cable guide is formed to separate the cables from the bracket, and a load applied by tensile forces of the cables is received by the cable holder and the bracket. For this reason, it is not necessary to increase stiffness of the cable guide itself as much as possible to increase holding stiffness of the cable guide with respect to the cable. Accordingly, the holding stiffness of the cable guide with respect to the cable can be increased by a simple structure, and an increase in size of the roller unit can be suppressed.

REFERENCE SIGNS LIST 1, 201, 301, 401 Roller unit
2 Base bracket (bracket)
10a, 10b Horizontal roller
11, 211, 311, 411 Cable holder
12b, 212b, 312b Sidewall
21 Vertical roller
34, 334 Cable end holding section
35, 335 Cable hook
236 Cable end insertion hole (insertion hole)
40, 240, 340, 440 Cable guide
41 Guide main body
43, 243 Leg section
43b Retaining section
101 Vehicle main body
103 Slide door
106 Center rail (guide rail)
110 Slide door automatic opening-closing device (vehicular opening-closing body driving device)
111 Driving unit (driving device)
112 Opening cable
112a, 113a Cable end
113 Closing cable
251 Leg section main body
252 Slip preventing mechanism
337, 437 Slit
337b Corner section
345 Cable introducing section
347 Claw section
412a First sidewall (sidewall)
412b Second sidewall (sidewall)
440a Open section

The invention claimed is:
1. A roller unit that slidably supports a slide door along a guide rail installed at a vehicle main body and to which other end of an opening cable and other end of a closing cable are connected, wherein one end of the opening cable and one end of the closing cable are connected to a driving device configured to automatically open and close the slide door, the roller unit comprising:
- a bracket installed over the guide rail and the slide door and that supports the slide door at a first end portion thereof which is on an opposite side to the vehicle main body;
- a roller installed at a second end portion of the bracket on a slide door side and that rolls in the guide rail;
- a cable holder formed integrally with the bracket at the second end portion of the bracket on the slide door side and that holds the other ends of the opening cable and the closing cable; and
- a cable guide detachably installed at the cable holder and that guides the opening cable and the closing cable,
- wherein the cable guide is formed to separate the opening cable and the closing cable from the bracket, and
- wherein the opening cable and the closing cable are wired by the cable guide in a manner so that the opening cable and the closing cable are offset toward a guide rail side with respect to the other ends of the opening cable and the closing cable.

2. The roller unit according to claim 1, wherein the cable guide is disposed between the other end of the opening cable attached to the cable holder and the other end of the closing cable attached to the cable holder, and
the opening cable and the closing cable are guided by the cable guide in an intersecting state with each other over the cable guide.

3. The roller unit according to claim 1, wherein the other ends of the opening cable and the closing cable are pivotably held by the cable holder.

4. The roller unit according to claim 1, wherein the cable guide comprises:
- a guide main body that guides the opening cable and the closing cable and that is extending in a wiring direction of the opening cable and the closing cable; and
- two leg sections respectively extending from both ends of the guide main body in a longitudinal direction toward the bracket.

5. The roller unit according to claim 4, wherein the leg sections of the cable guide comprise retaining sections disposed and fixed between the other ends of the opening cable and the closing cable and any one of the cable holder and the bracket.

6. The roller unit according to claim 4, wherein cable introducing sections that guide the opening cable and the closing cable to the guide main body are installed at both ends of the guide main body in the longitudinal direction.

7. The roller unit according to claim 6, wherein the cable introducing sections are formed at both ends of the guide main body in the longitudinal direction and formed at both ends of the guide main body in a short direction, and are extending in the longitudinal direction and inclining toward the bracket.

8. The roller unit according to claim 4, wherein the leg sections of the cable guide are held at the cable holder together with the other ends of the opening cable and the closing cable, and
slip preventing mechanisms that prevent falling of the other ends of the opening cable and the closing cable from the leg sections are installed at the leg sections.

9. The roller unit according to claim 8, wherein the other ends of the opening cable and the closing cable respectively comprise columnar-shaped cable ends, insertion holes into which the cable ends are inserted are formed in the leg sections of the cable guide, and
sides of the insertion holes in leg sections, which is opposite to the sides to which the tensile forces of the other ends of the opening cable and the closing cable are applied, function as the slip preventing mechanisms.

10. The roller unit according to claim 1, wherein the other ends of the opening cable and the closing cable respectively comprise columnar-shaped cable ends,
the cable holder comprises:
cable end holding sections disposed at sides to which tensile forces of the other ends of the opening cable and the closing cable are applied; and
cable hooks disposed at opposite sides of the cable end holding sections of the other ends of the opening cable and the closing cable, and
outer circumferential sections of the cable ends are disposed and fixed between the cable end holding sections and the cable hooks.

11. The roller unit according to claim 10, wherein two sidewalls of the cable hooks are disposed in parallel to a direction perpendicular to the wiring direction of the opening cable and the closing cable,
a distance between the two sidewalls is set to allow the opening cable and the closing cable to be inserted therethrough, and
slits through which the opening cable and the closing cable are allowed to be inserted from an outside of the sidewalls in the plate thickness direction toward an inside of the sidewalls in a plate thickness direction are formed in the two sidewalls at sides opposite to the sides to which the tensile forces of the other ends of the opening cable and the closing cable are applied.

12. The roller unit according to claim 11, wherein claw sections that engage with the cable hooks are formed at the cable guide.

13. The roller unit according to claim 12, wherein the claw sections are formed to cover the slits and corner sections of slits that are at inner surface sides of the sidewalls.

14. The roller unit according to claim 1, wherein the roller has:
a horizontal roller having a first rotary shaft provided in a vertical direction; and
a vertical roller having a second rotary shaft provided in a horizontal direction, and
the cable guide is disposed between the vertical roller and the guide rail.

15. The roller unit according to claim 14, wherein the vertical roller is rotatably supported by a spindle formed integrally with the cable holder,
the cable guide is detachably installed at the spindle,
the cable guide is formed to surround the vertical roller and to be open at one side in a detachment direction of the cable guide, and
the opening cable and the closing cable are wired at an opposite side of the bracket of the cable guide.

16. A vehicular opening-closing body driving device comprising:
the roller unit according to claim 1; and
the driving device to which the one ends of the opening cable and the closing cable are connected.

* * * * *